US011818799B1

(12) United States Patent
Chu et al.

(10) Patent No.: US 11,818,799 B1
(45) Date of Patent: Nov. 14, 2023

(54) DATA UNIT AGGREGATION IN A WIRELESS NETWORK WITH MULTIPLE CHANNEL SEGMENTS

(71) Applicant: Marvell Semiconductor, Inc., Santa Clara, CA (US)

(72) Inventors: Liwen Chu, San Ramon, CA (US); Hongyuan Zhang, Fremont, CA (US); Hui-Ling Lou, Sunnyvale, CA (US); Po Wei Tan, San Jose, CA (US); Rui Cao, Sunnyvale, CA (US); Ken Kinwah Ho, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 16/889,798

(22) Filed: Jun. 1, 2020

Related U.S. Application Data

(60) Provisional application No. 62/854,820, filed on May 30, 2019.

(51) Int. Cl.
*H04W 80/02* (2009.01)
*H04W 74/08* (2009.01)
(Continued)

(52) U.S. Cl.
CPC ........... *H04W 80/02* (2013.01); *H04L 1/1614* (2013.01); *H04L 5/0055* (2013.01); *H04W 74/0808* (2013.01); *H04W 84/12* (2013.01)

(58) Field of Classification Search
CPC . H04W 80/02; H04W 74/0808; H04W 84/12; H04L 1/1614; H04L 5/0055
See application file for complete search history.

(56) References Cited

U.S. PATENT DOCUMENTS 8,773,969 B1   7/2014   Zhang et al.
8,787,385 B2   7/2014   Liu et al.
(Continued)

FOREIGN PATENT DOCUMENTS

EP   2028809 A2   2/2009
EP   2999252 A1   3/2016
(Continued)

OTHER PUBLICATIONS

Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).
(Continued)

*Primary Examiner* — Michael J Moore, Jr.

(57) ABSTRACT

A first communication device selects respective sets of medium access control (MAC) layer data units for transmission via respective channel segments of a communication channel, where the first channel segment and the second channel segment are non-overlapping frequency segments of the communication channel. The first communication device generates respective aggregate MAC layer data units to include the respective sets of MAC layer data units, generates respective physical (PHY) layer data units to include the respective aggregate MAC layer data units, and transmits the respective PHY layer data units in the respective channel segments to one or more second communication devices, where transmissions of the respective aggregate MAC layer data units in the respective channel segment overlap in time.

20 Claims, 9 Drawing Sheets

(51) Int. Cl.
*H04L 5/00* (2006.01)
*H04L 1/1607* (2023.01)
*H04W 84/12* (2009.01)

(56) References Cited

U.S. PATENT DOCUMENTS

| | | | |
|---|---|---|---|
| 9,450,743 | B1 | 9/2016 | Chu et al. |
| 9,668,243 | B1 * | 5/2017 | Gong ................. H04W 72/0453 |
| 10,129,881 | B2 | 11/2018 | Yang et al. |
| 10,257,806 | B2 | 4/2019 | Chu et al. |
| 10,349,413 | B2 | 7/2019 | Zhang et al. |
| 11,363,657 | B1 | 6/2022 | Chu et al. |
| 2004/0264561 | A1 | 12/2004 | Alexander et al. |
| 2006/0114928 | A1 | 6/2006 | Utsunomiya et al. |
| 2011/0249659 | A1 | 10/2011 | Fontaine et al. |
| 2013/0266136 | A1 | 10/2013 | Chu et al. |
| 2014/0036895 | A1 * | 2/2014 | Liu ....................... H04L 1/1614 370/338 |
| 2015/0098541 | A1 | 4/2015 | Ben-Bassat |
| 2015/0249936 | A1 * | 9/2015 | Chen ................... H04W 28/065 370/329 |
| 2015/0295841 | A1 * | 10/2015 | Neelisetty ............... H04L 47/56 370/328 |
| 2016/0088602 | A1 * | 3/2016 | Seok ..................... H04L 5/0055 370/338 |
| 2016/0142232 | A1 * | 5/2016 | Gao ....................... H04L 1/1614 370/329 |
| 2016/0212748 | A1 | 7/2016 | Yang et al. |
| 2016/0241315 | A1 | 8/2016 | Kwon |
| 2016/0302200 | A1 | 10/2016 | Yang et al. |
| 2017/0048048 | A1 | 2/2017 | Seok |
| 2017/0149547 | A1 | 5/2017 | Kim et al. |
| 2017/0181136 | A1 | 6/2017 | Bharadwaj et al. |
| 2017/0289933 | A1 | 10/2017 | Segev et al. |
| 2017/0311204 | A1 | 10/2017 | Cariou et al. |
| 2017/0325178 | A1 | 11/2017 | Verma et al. |
| 2017/0366329 | A1 | 12/2017 | Cao et al. |
| 2018/0020476 | A1 | 1/2018 | Aijaz et al. |
| 2018/0115403 | A1 | 4/2018 | Sakai et al. |
| 2018/0160429 | A1 | 6/2018 | Seok |
| 2018/0302858 | A1 | 10/2018 | Son et al. |
| 2019/0123863 | A1 | 4/2019 | Zhang et al. |
| 2019/0150214 | A1 * | 5/2019 | Zhou ..................... H04L 1/1621 370/329 |
| 2019/0173625 | A1 * | 6/2019 | Ghosh ................... H04L 1/1854 |
| 2019/0182714 | A1 | 6/2019 | Chu et al. |
| 2019/0182863 | A1 | 6/2019 | Chu et al. |
| 2019/0190752 | A1 | 6/2019 | Chen et al. |
| 2019/0349930 | A1 | 11/2019 | Chu et al. |
| 2020/0008267 | A1 * | 1/2020 | Noh ........................ H04W 80/08 |
| 2020/0037324 | A1 * | 1/2020 | Chu ....................... H04L 5/0055 |
| 2020/0052832 | A1 * | 2/2020 | Tian ....................... H04L 1/1845 |
| 2020/0092881 | A1 * | 3/2020 | Nezou ................. H04W 72/1257 |
| 2020/0112878 | A1 * | 4/2020 | Liu ........................ H04L 1/1845 |
| 2020/0136785 | A1 * | 4/2020 | Son ........................ H04W 72/04 |
| 2020/0305164 | A1 * | 9/2020 | Yang ....................... H04W 4/00 |
| 2020/0329519 | A1 * | 10/2020 | Cao ........................ H04L 5/0046 |
| 2020/0344801 | A1 * | 10/2020 | Epstein ................ H04L 27/2602 |
| 2021/0250133 | A1 * | 8/2021 | Chun ..................... H04L 1/1822 |

FOREIGN PATENT DOCUMENTS

| | | | | |
|---|---|---|---|---|
| GB | 2501898 | A | 11/2013 | |
| WO | WO-2006/000955 | A1 | 1/2006 | |
| WO | WO-2012/026779 | A2 | 3/2012 | |
| WO | 2013168105 | A1 | 11/2013 | |
| WO | 2013179270 | A1 | 12/2013 | |
| WO | WO-2015/099803 | A1 | 7/2015 | |
| WO | WO-2017/026937 | A1 | 2/2017 | |
| WO | WO-2020052784 | A1 * | 3/2020 | ........... H04L 5/0098 |
| WO | WO-2020146401 | A * | 7/2020 | ........... H04W 76/15 |

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmc™/D8.0 (revision of IEEE Std. 802.11™-2012) "Draft Standard for Information technology —Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Orfanos et al., "A New Distributed Coordination Function for W-LANs with Multiple Channel Structure," Proceedings of the 14th 1st Mobile and Wireless Communications Summit, Dresden, Germany, 5 pages (Jun. 19, 2005).

Zhang et al., "EHT Technology Candidate Discussions," doc: IEEE 802.11-18/1161r0, *The Institute of Electrical and Electronics Engineers, Inc.*, pp. 1-10, Jul. 8, 2018.

U.S. Appl. No. 16/847,326, Chu et al., "Allocating Resource Units for Uplink Multi-User Transmissions in Wide Bandwidths," filed Apr. 13, 2020.

* cited by examiner

DATA UNIT AGGREGATION IN A WIRELESS NETWORK WITH MULTIPLE CHANNEL SEGMENTS

CROSS REFERENCES TO RELATED APPLICATIONS

This application claims the benefit of U.S. Provisional Patent Application No. 62/854,820, entitled "Basic Service Set (BSS) with Multiple Channel Segments: Backoff and Aggregate MAC Protocol Data Unit (A-MPDU) Aggregation," filed on May 30, 2019, which is hereby incorporated herein by reference in its entirety.

FIELD OF TECHNOLOGY

The present disclosure relates generally to wireless communication systems, and more particularly to operation of a network with multiple aggregated communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels). Additionally, the IEEE 802.11be Standard may permit aggregation 20 MHz sub-channels in different channel segments (for example, separated by a gap in frequency) to form a single aggregate channel. Further, the IEEE 802.11be Standard may permit aggregation 20 MHz sub-channels in different radio frequency (RF) bands to form a single aggregate channel.

The current IEEE 802.11 Standard (referred to herein as "the IEEE 802.11 Standard" for simplicity) provides for a first communication device to transmit packets to a second communication device via a single communication channel, and for the second communication device to acknowledge receipt of packets received via the single communication channel.

SUMMARY

In an embodiment, a method for communicating in a wireless local area network (WLAN) via a communication channel that includes a plurality of channel segments includes: selecting, at a first communication device, respective sets of medium access control (MAC) layer data units for transmission via respective channel segments, among the plurality of channel segments, to one or more second communication devices, including selecting at least i) a first set of MAC layer data unit for transmission in a first channel segment and ii) a second set of MAC layer data units for transmission in a second channel segment, wherein the first channel segment and the second channel segment are non-overlapping frequency segments; generating, at the first communication device, respective aggregate MAC layer data units to include the respective sets of MAC layer data units, including generating i) a first aggregate MAC layer data unit to include the first set of MAC layer data units and ii) a second aggregate MAC layer data unit to include the second set of MAC layer data units; generating, at the first communication device, respective physical (PHY) layer data units to include the respective aggregate MAC layer data units, including generating i) a first PHY layer data unit to include the first aggregate MAC layer data unit and ii) a second PHY layer data unit to include the second aggregate MAC layer data unit; and transmitting, from the first communication device, the respective PHY layer data units to the one or more second communication devices, including transmitting i) the first PHY layer data unit in the first channel segment and ii) the second PHY layer data unit in the second channel segment, wherein transmission of the first PHY layer data unit in the first channel segment overlaps in time with transmission of the second PHY layer data unit in the second channel segment.

In another embodiment, a first communication device comprises a wireless network interface device that is configured to communicate in a wireless local area network (WLAN) via a communication channel that includes a plurality of channel segments, the wireless network interface device having one or more integrated circuit (IC) devices configured to: select respective sets of medium access control (MAC) layer data units for transmission via respective channel segments, among the plurality of channel segments, to one or more second communication devices, the one or more IC devices being configured to select at least i) a first set of MAC layer data unit for transmission in a first channel segment and ii) a second set of MAC layer data units for transmission in a second channel segment, wherein the first channel segment and the second channel segment are non-overlapping frequency segments; generate respective aggregate MAC layer data units to include the respective sets of MAC layer data units, the one or more IC devices being configured to generate i) a first aggregate MAC layer data unit to include the first set of MAC layer data units and ii) a second aggregate MAC layer data unit to include the second set of MAC layer data units; generate respective physical (PHY) layer data units to include the respective aggregate MAC layer data units, the one or more IC devices being configured to generate i) a first PHY layer data unit to include the first aggregate MAC layer data unit and ii) a second PHY layer data unit to include the second aggregate MAC layer data unit, and transmit the respective PHY layer data units to the one or more second communication devices, the one or more IC devices being configured to transmit i) the first PHY layer data unit in the first channel segment and ii) the second PHY layer data unit in the second channel segment, wherein transmission of the first PHY layer data unit in the first channel segment overlaps in time with transmission of the second PHY layer data unit in the second channel segment.

DETAILED DESCRIPTION

A next generation wireless local area network (WLAN) protocol (e.g., the IEEE 802.11be Standard, sometimes referred to as the Extremely High Throughput (EHT) WLAN Standard) may permit communication devices to operate with communication channels that comprise multiple channel segments. The different channel segments may be in a single radio frequency (RF) band or in different RF bands. To perform transmissions over multiple channel segments, communication In various embodiments described herein, communication devices contend for channel access to respective ones of multiple channel segments and select data for transmission via the multiple channel segments. Channel contention and data selection techniques described herein allow a first communication device to obtain access for transmission of data units of certain traffic types in respective ones of the multiple channel segments to one or more second communication devices, and to select data for transmission in the multiple channel segments to the one or more second communication devices, in manners that allow the one or more second communication devices to properly receive and acknowledge receipt of respective data units transmitted in multiple channel segments, even when the respective data units are transmitted simultaneously in the multiple channel segments, in various embodiments.

Figure 1:
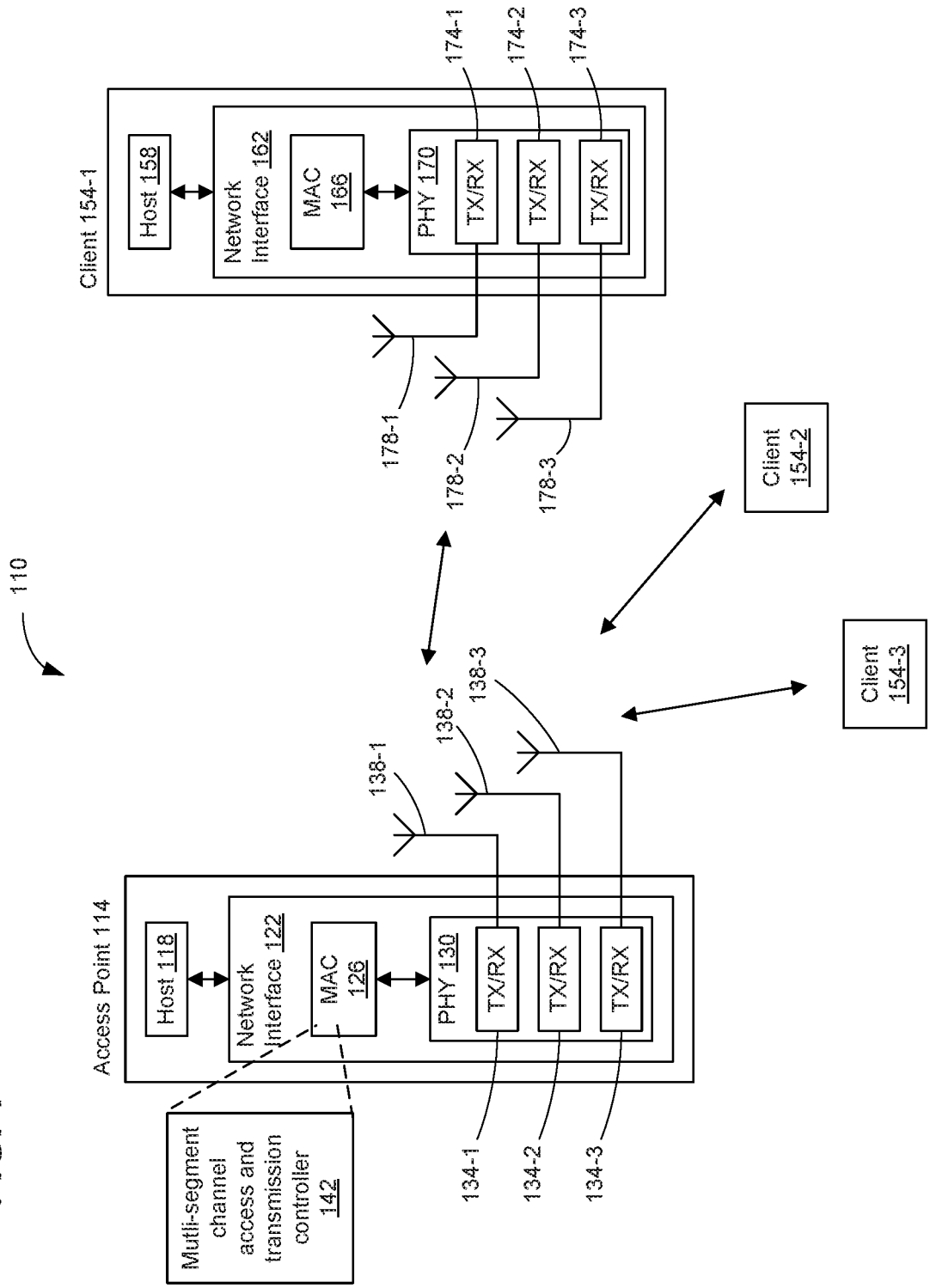
FIG. 1 is a block diagram of an example wireless local area network (WLAN) that supports communication in a communication channel that includes multiple channel segments, according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), aggregate MPDUs (A-MPDUs), etc., and provide the MAC layer data units to the PHY processor 130. MPDUs and A-MPDUs exchanged between the MAC processor 126 and the PHY processor 130 are sometimes referred to as physical layer convergence procedure (PLCP) (or simply "PHY") service data units (PSDUs).

The PHY processor 130 may be configured to receive MAC layer data units (or PSDUs) from the MAC processor 126 and encapsulate the MAC layer data units (or PSDUs) to generate PHY data units such as PLCP (or "PHY") protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes, or implements, a multi-segment channel access and transmission controller 142 that is configured to contend for access to multiple channel segments for transmission of data of various traffic types in the multiple channel segments, according to an embodiment, and to select sets of data units for transmission in respective ones of the multiple channel segments, in an embodiment. As described in more detail below, channel access contention and data selection techniques implemented by the multi-segment channel transmission controller 142 allow the AP 114 to transmit sets of MAC layer data units to one or more client stations 154 in respective ones of the multiple channel segments in manners that allow the one or more client stations 154 to properly receive and acknowledge receipt of respective data units transmitted in multiple ones of the channel segments, even when the respective data units are transmitted simultaneously in the multiple channel segments, in various embodiments.

In an embodiment, the multi-segment channel access and transmission controller 142 is implemented by a processor executing machine readable instructions stored in a memory, where the machine readable instructions cause the processor to perform acts described in more detail below. In another embodiment, the multi-segment channel access and transmission controller 142 additionally or alternatively comprises hardware circuitry that is configured to perform acts described in more detail below. In some embodiments, the hardware circuitry comprises one or more hardware state machines that are configured to perform acts described in more detail below.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In some embodiments, the MAC processor 166 includes a multi-segment channel access and transmission controller (not shown) the same as or similar to the multi-segment channel access and transmission controller 142 of the AP 114. For example, the client station 154-1 is configured to contend for access to multiple channel segments for transmission of data of various traffic types in the multiple channel segments, according to an embodiment, and to select sets of data units for transmission in respective ones of the multiple channel segments as described herein, according to some embodiments.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, multiple different frequency bands within the RF spectrum are employed for signal transmissions within the WLAN 110. In an embodiment, different communication devices (i.e., the AP 114 and the client stations 154) may be configured for operation in different frequency bands. In an embodiment, at least some communication devices (e.g., the AP 114 and the client station 154) in the WLAN 110 may be configured for simultaneous operation over multiple different frequency bands. Suitable examples of frequency bands include, a first frequency band corresponding to a frequency range of approximately 2.4 GHz-2.5 GHz ("2.4 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band").

Each of the frequency bands comprise multiple component channels which may be combined within the respective frequency bands to generate channels of wider bandwidths, as described above. In an embodiment corresponding to multi-channel segment operation over a first channel segment and a second channel segment, the first channel segment and the second channel segment may be in separate frequency bands, or within a same frequency band. In some embodiments, at least one communication device (e.g., at least the AP 114) in the WLAN 110 is configured for simultaneous operation over any two of the 2.4 GHz band, the 5 GHz band, and the 6 GHz band. In some embodiments, at least one communication device (e.g., at least the AP 114) in the WLAN 110 is configured for simultaneous operation over all three of the 2.4 GHz band, the 5 GHz band, and the 6 GHz band.

Figure 2:
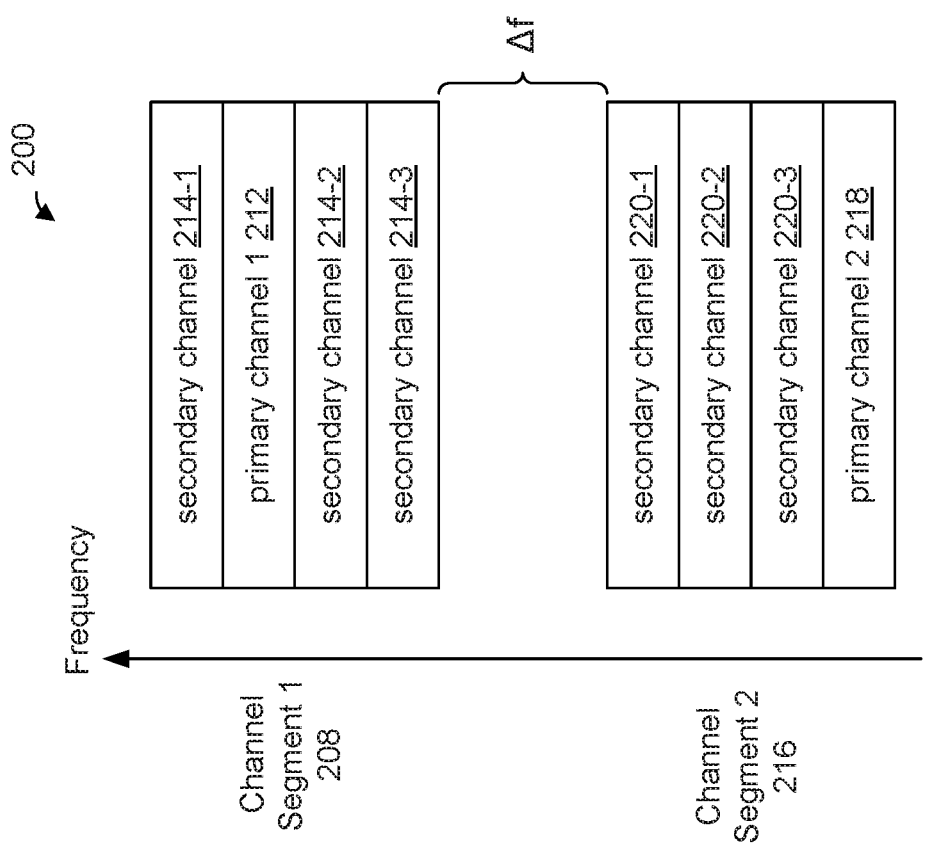
FIG. 2 is a diagram of an example communication channel that includes multiple channel segments, according to an embodiment.

FIG. 2 is a diagram of an example communication channel 200 used for communication in the WLAN 110, according to an embodiment. In an embodiment, the communication channel 200 corresponds to an operating channel of the AP 114, or of a basic service set (BSS) supported by the AP 114. In another embodiment, the communication channel 200 corresponds to an operating channel of a client station 154 (e.g., the client station 154-1). In other embodiments, the communication channel 200 is employed by a communication device (e.g., an AP or a client station) in a suitable communication network different from the WLAN 110. An operating channel such as the communication channel 200 that corresponds to an operating channel of an AP or a BSS supported by the AP is sometimes referred to herein as an "AP operating channel" or a "BSS operating channel." An operating channel such as the communication channel 200 that corresponds to an operating channel of a client station is sometimes referred to herein as an "STA operating channel."

The communication channel 200 includes a first channel segment 208 aggregated with a second channel segment 216. The first channel segment 208 has a first bandwidth and comprises a first number of component channels, and the second channel segment 216 has a second bandwidth and comprises a second number of component channels. In various embodiments, the first bandwidth of the first channel segment 208 and the second bandwidth of the second channel segment 216 are equal or are unequal. In various embodiments, the first number of component channels of the first channel segment 208 and the second number of composite channels of the second channel segment 216 are equal or are unequal.

The first channel segment 208 and the second channel segment 216 are non-overlapping frequency segments, according to an embodiment. In an embodiment, the first channel segment 208 and the second channel segment 216 are non-adjacent in frequency. For example, a gap in frequency exists between the first channel segment 208 and the second first channel segment 216. In various embodiments, the gap is at least 500 kHz, at least 1 MHz, at least 5 MHz, at least 20 MHz, etc. In another embodiment, the first channel segment 208 and the second channel segment 216 are adjacent in frequency. In this embodiment, there is no frequency gap between first channel segment 208 and the second channel segment 216.

In an example embodiment, the first channel segment 208 has a bandwidth of 80 MHz and the second channel segment 216 has a bandwidth of 80 MHz. In an embodiment in which the first channel segment 208 and the second channel segment 216 are not adjacent in frequency, the communication channel 200 is sometimes referred to as an 80+80

MHz channel. On the other hand, in an embodiment in which the first channel segment 208 and the second channel segment 216 are adjacent in frequency, the communication channel 200 is sometimes referred to as 160 MHz channel. In general, communication channels similar to the communication channel 200 in which the first channel segment and the second channel segment are not adjacent in frequency, the aggregate communication channel is referred to as (bandwidth of the first channel segment)+(bandwidth of the second channel segment) channel. On the other hand, communication channels similar to the communication channel 200 in which the first channel segment and the second channel segment are adjacent in frequency, or in which the second channel segment 216 is omitted (i.e., the second channel segment 216 has a bandwidth of 0 MHz), the communication channel 200 is referred to as (the sum of the first channel segment bandwidth and the second channel segment bandwidth) channel. In an embodiment, valid channel configurations of the communication channel 200 include: 20 MHz channel, 40 MHz channel, 60 MHz channel, 80 MHz channel, 100 MHz, 120 MHz channel, 140 MHz channel, channel 160 MHz channel, 20+40 MHz channel, 20+80 MHz channel, 40+80 MHz channel, and so on. In an embodiment, a respective bandwidth of each channel segment 208, 216 is selected from a set of possible channel bandwidths of 20 MHz, 40 MHz and 80 MHz. In other embodiments, other suitable sets of possible bandwidths are utilized.

The communication channel 200 includes multiple primary channels, in the illustrated embodiment. For example, at least one component channel of the first channel segment 208 and at least one component channel of the second channel segment 216 is designated as a primary channel, in an embodiment. In the illustrated embodiment, a first component channel of the first channel segment 208 is designated as a first primary channel 212 and a second component channel of the second channel segment 216 is designated as a second primary channel 218. In some embodiments, the communication channel 200 includes more than two primary channels. For example, more than two component channels of the communication channel 200 are designated as primary channels, in some embodiments. In yet another embodiment, the communication channel 200 includes only a single primary channel. For example, only a single component channel of one of the first channel segment 208 and the second channel segment 216 is designated as a primary channel, and the other one of the first channel segment 208 and the second channel segment 216 does not include a primary channel, in an embodiment.

The communication channel 200 also includes secondary channels, in an embodiment. In an embodiment, each component channel of the first channel segment 208 that is not designated as a primary channel is designated as a secondary channel. Similarly, each component channel of the second channel segment 216 that is not designated as a primary channel is designated as a secondary channel, in an embodiment. In the illustrated embodiment, the first channel segment 208 includes three secondary channels 214 and the second channel segment 216 includes three secondary channels 220. In other embodiments, the first channel segment 208 and/or the second channel segment 216 includes another suitable number (e.g., 0, 1, 2, 4, 5, etc.) of secondary channels 214, 220. In some embodiments, the number of secondary channels 214 of the first channel segment 208 is not equal to the number of secondary channels 220 of the second channel segment 216. Communication devices utilizes the one or more primary channels of the communication channel 200 for various operations, such as for transmission and reception of various management transmissions (e.g., transmissions associated with association of a client station 154 with the AP 114, beacon transmissions by the AP 114, operating channel bandwidths switch announcement transmissions, etc.), for conducting clear channel assessment (CCA) procedures, etc., in various embodiments.

In some embodiments, respective channel segments such as illustrated in FIG. 2 are associated with different MAC addresses. For example, in embodiments in which the respective frequency segments are used as respective communication links, the respective communication links correspond to different MAC addresses.

In an embodiment, communication devices (e.g., the AP 114 and client stations 154) in the WLAN 110 contend for a wireless communication medium using clear channel assessment (CCA) procedures, such as carrier sense multiple access with collision avoidance (CSMA/CA) procedures or other suitable channel assessment procedures. The communication devices use the CCA procedures to determine when the communication devices are permitted to transmit in a communication channel, such as the communication channel, that comprises multiple channel segments, in an embodiment. The CCA procedures include a virtual carrier sensing procedure, in an embodiment. The CCA procedures also include physical carrier sensing and energy detection procedures, in an embodiment. To implement the virtual carrier sensing procedure, the communication devices maintain respective network allocation vectors (NAVs) that include timers for tracking when another communication device has seized control or "ownership" of the wireless communication medium. For example, when a communication device (e.g., the AP 114 or a client station 154) receives a valid signal, such as a PHY data unit that conforms to a particular communication protocol (e.g., the IEEE 802.11be or another suitable communication protocol), the communication device examines duration information included in a header and/or a preamble of the PHY data unit, where the duration information indicates a length of time that another communication device has taken ownership of a communication medium. The communication device then uses the duration information in the PHY data unit to set a network allocation vector (NAV) timer, and the NAV timer begins to decrement. When a value of the NAV timer is non-zero, this indicates that another communication device owns the wireless communication medium and that the communication device therefore should generally refrain from transmitting in the wireless communication medium. On the other hand, when the value of the NAV timer reaches zero, this indicates that the wireless communication medium is not currently owned by another communication device.

In an embodiment, when the NAV is zero, the communication device implements the physical carrier sensing and energy detection procedures. To implement the physical carrier sensing and energy detection procedure, the communication device senses a signal level and an energy level in the wireless communication medium for a predetermined length of time and invoking one or more backoff counters to further sense the communication channel after the predetermined length of time, in an embodiment. In an embodiment, the predetermined length of time is a length of time corresponding to a distributed coordination function (DCF) interframe space (DIFS) time period or another suitable time period. In an embodiment, as explained in more detail below, the predetermined length of time is a length of time corresponding to an arbitration interframe space (AIFS), wherein the value of the AIFS depends on an access category (AC) associated with traffic that the communication device is attempting to transmit.

Physical carrier sensing involves valid signal detection in the wireless communication medium, in an embodiment, and the physical carrier sensing procedure is sometimes referred to herein as a "signal detection" procedure. In an embodiment, if the communication detects a valid signal in the wireless communication medium, the communication device decodes a duration indication in the signal and determines that the medium is busy for the duration indicated in a header and/or a preamble of the signal. In energy detection, the communication device does not detect a valid signal, but if the communication device detects an energy level that is above an energy detection threshold value, the communication device determines that the medium is busy for the duration of time for which the energy remains above the threshold.

In an embodiment, if, during the predetermined length of time, no valid signal is detected in the wireless communication medium and the detected energy in the wireless communication medium remains below an energy detection threshold, then the communication device invokes one or more backoff procedures in which the communication device continues to perform signal detection and energy detection in the wireless communication medium, to determine whether the wireless communication medium is busy or idle, for an additional deferral time period. In an embodiment, each of the one or more backoff procedures includes randomly or pseudorandomly choosing an initial value for the backoff counter when the current value of the backoff counter is zero. In an embodiment, the communication device chooses the initial value for the backoff counter from a range of initial values [0, CW], where CW is a contention window (CW) parameter, where the initial value and CW are in units of slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of Cwmax, in an embodiment. The parameters CWmin and CWmax are also in units of slots.

In an embodiment, while the communication device determines that the wireless communication medium is idle, the communication device decrements the backoff counter. When the communication device determines that the wireless communication medium is busy, the communication device pauses the backoff counter and does not resume decrementing the backoff counter until the wireless communication medium is subsequently determined to be idle. For example, when the communication device detects a valid signal and decodes a duration field in the valid signal, the communication device pauses the backoff counter for a length of time corresponding to the duration indicated in the duration field of the valid signal, in an embodiment. As another example, when the communication device detects an energy level that is above the energy detection threshold, the communication device pauses the backoff times while the energy level remains above the energy detection threshold level, in an embodiment. When the communication device determines that the wireless communication medium is idle, the communication device resumes counting down the backoff counter. Setting the backoff counter to an initial value chosen randomly or pseudo-randomly (e.g., as described above) ensures that backoff counters of different communication devices in the network tend to reach zero at different times, in at least some embodiments. In an embodiment, when the backoff counter reaches zero, the communication device determines that the communication device is free to transmit.

In an embodiment, the communication device is configured to implement an enhanced distributed channel access (EDCA) backoff procedure in which multiple EDCA entities (e.g., multiple EDCA counters) in the communication device independently compete for channel access in parallel, where respective ones of the multiple EDCA entities correspond to respective access categories. In an embodiment, four access categories, including a voice (VO) traffic access category, a video (VI) traffic access category, a best effort (BE) traffic access category, and a background (BK) traffic access category. Generally, the voice and video traffic access categories correspond to relatively higher priority traffic and the best effort and background traffic access categories correspond to relatively lower priority traffic streams, in an embodiment. In other embodiments, other suitable numbers of access categories and/or other suitable access category types are utilized. The EDCA entities associated with the different access categories utilize different channel access parameters, such as different AIFS, CWmin and CWmax values. The different AIFS, CWmin and CWmax values are chosen such that an EDCA entity associated with an AC corresponding to a relatively higher priority has a higher chance of obtaining access to the communication channel, in an embodiment.

The multiple EDCA entities operate in parallel to implement respective physical carrier sensing and energy detection procedures in the manner described above, in an embodiment. For example, when the NAV is zero, multiple EDCA entities associated with respective ACs independently sense a signal level and an energy level in the wireless communication medium for respective lengths of time corresponding to different AIFS values of the ACs, and implement respective backoff procedures (by invoking, and counting down, respective backoff counters, in a set of EDCA counters, that utilize CWmin and CWmax parameter values of the ACs) in the manner described above, in an embodiment. When one of the multiple EDCA entities determines that the communication channel is available, thereby gaining access to the communication channel, the communication device transmits of one or more MAC layer data units associated with the corresponding AC in the communication channel, in an embodiment.

In an embodiment, the communication device maintains multiple NAV timers corresponding to multiple channel segments. For example, with reference to FIG. 2, the communication device maintains a first NAV timer corresponding to the channel segment 208 and a second NAV timer corresponding to channel segment 216 of the communication channel 200, in an embodiment. The communication device maintains each NAV timer independently of any other NAV timer of the multiple NAV timers maintained by the communication device, in an embodiment. The communication device independently counts down each NAV timer of the multiple NAV timers, in an embodiment.

When a value a NAV timer corresponding to a particular channel segment is zero, the communication device performs the physical carrier sense procedure in the particular channel segment, including invoking one or more backoff counters (e.g., respective EDCA backoff counters associated with respective ACs) as described above. In an embodiment, when a backoff counter reaches zero, the communication device determines that at least the primary channel of the particular channel segment is available for transmission by the communication device. Additionally, the communication device checks whether one or more other component channels are also available for transmission by the communication device along with the primary channel of the particular channel segment, in an embodiment. Determining whether a secondary channel is also available for transmission by the communication device involves sensing the secondary channel a predetermined time interval, such as point coordination function (PCF) interframe space (PIFS) time period or another suitable time period. On the other hand, determining whether another primary channel of another one of the channel segments is also available for transmission by the communication device involves checking a NAV timer associated with the other primary channel and, if the NAV timer is zero, performing physical carrier sensing in the other primary channel, in an embodiment. In an embodiment, when the communication device determines that at least a portion of each of the multiple channel segments is available for transmission by the communication device, the communication device performs a transmission over the multiple channel segments.

In an embodiment, the communication device performs respective backoff procedures in connection with respective ones of multiple channel segments. The communication device maintains respective sets of EDCA backoff counters corresponding to respective ones of the multiple channel segments. In an embodiment, when the communication device gains access to the first channel segment for transmission of MAC layer data units associated with a particular AC (e.g., a particular traffic type corresponding to the particular AC), the communication device temporally suspends the backoff counter associated with the corresponding AC in the second channel segment, to ensure that MAC layer data units associated with the particular traffic type corresponding to the particular AC will not be transmitted in the second channel segment simultaneously with transmission of MAC layer data units associated with the particular traffic type corresponding to the particular AC in the first channel segment. After transmission of the MAC layer data units associated with the particular traffic type corresponding to the particular AC is completed in the first channel segment, the communication device resumes the suspended backoff counter in the second channel segment, in an embodiment. In another embodiment, when the communication device gains access to the first channel segment for transmission of MAC layer data units associated with a particular AC (e.g., a particular traffic type corresponding to the particular AC), the communication device does not suspend the backoff counter associated with the corresponding AC in the second channel segment. However, if the communication device gains access to the second channel segment for transmission of MAC layer data units associated with the particular traffic type corresponding to the particular AC before the completion of transmission of the MAC layer data units associated with the particular traffic type corresponding to the particular AC in the first channel segment, the communication device treats the channel access to the second channel segment as an internal collision, and restarts the backoff counter associated with the corresponding AC using a newly selected CW value in the second channel segment.

Figure 3A:
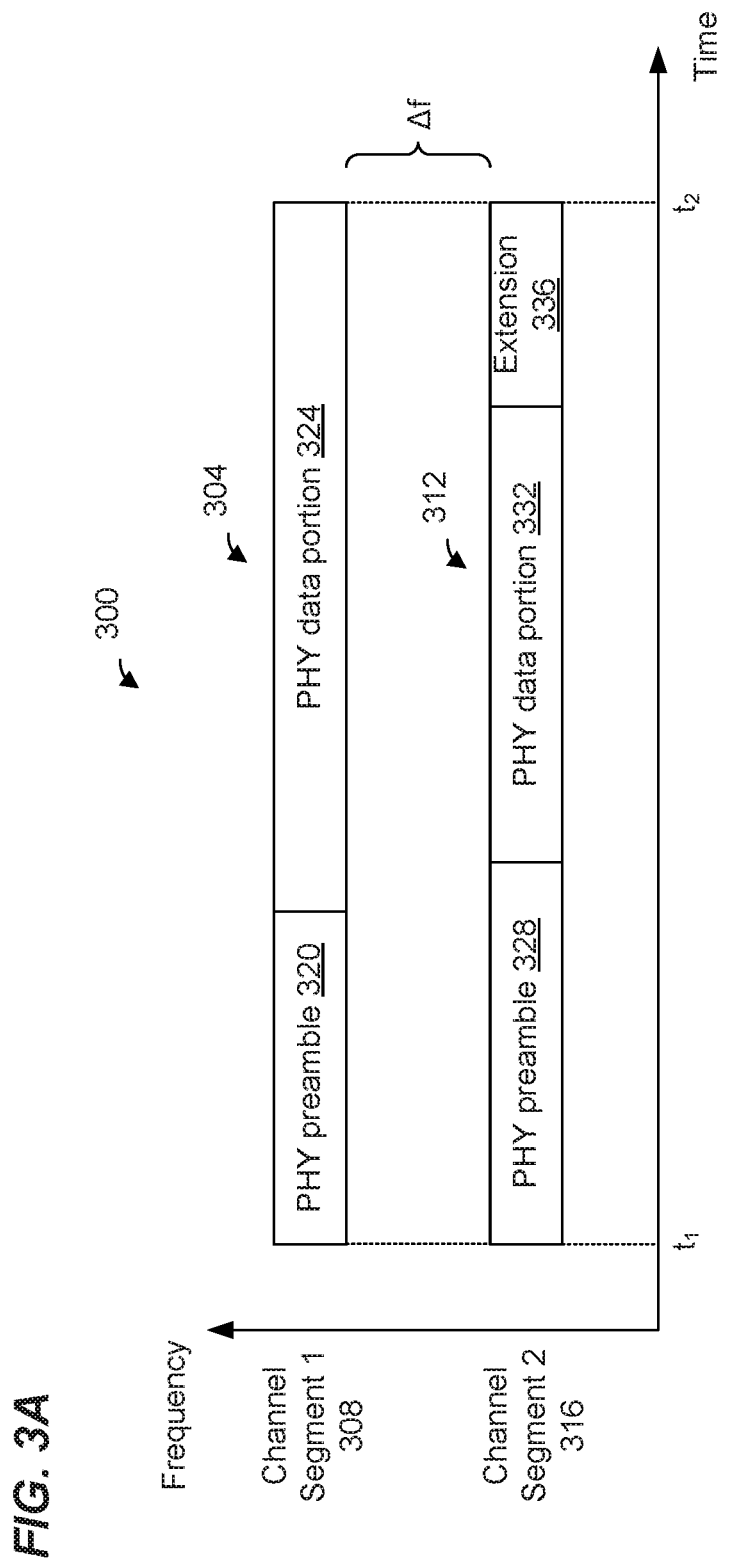
FIG. 3A is a diagram of an example transmission over different channel segments, according to an embodiment.

FIG. 3A is a diagram of an example transmission 300 by a communication device over different channel segments, according to an embodiment. In an embodiment, the transmission 300 is generated and transmitted by the network interface device 122 (FIG. 1) to one or more client stations 154 (e.g., the client station 154-1). In another embodiment, the transmission 300 is generated and transmitted by the network interface device 162 (FIG. 1) to the AP 114. In an embodiment, the communication device transmits the transmission 300 when the communication determines that the first channel segment and the second channel are available for initiating transmission by the communication device at a same time, in an embodiment. In other embodiments, the communication device transmits the transmission 300 in other suitable scenarios.

In an embodiment, the transmission 300 corresponds to a single user (SU) transmission that is generated and transmitted to a single communication device. In another embodiment, the transmission 300 corresponds to a multi-user (MU) transmission that includes data for multiple communication devices (e.g., multiple ones of the client stations 154). For example, in an embodiment, the MU transmission 300 is an OFDMA transmission. In another embodiment, the MU transmission 300 is an MU-MIMO transmission.

The transmission 300 comprises a first RF signal 304 (sometimes referred to herein as simply "first signal" 304) in a first channel segment 308 and a second RF signal 312 (sometimes referred to herein as simply "second signal" 312) in a second channel segment 316. Transmission of the first signal 304 and transmission of the second signal 312 overlap in time, in an embodiment. The first signal 304 corresponds to a first PPDU and the second signal 312 corresponds to a second PPDU, according to an embodiment. In another embodiment, the first signal 304 and the second signal 312 correspond to a single PPDU. The first signal 304 comprises a PHY preamble 320 and a PHY data portion 324. The second signal 312 comprises of a PHY preamble 328, a data portion 332, and optional padding 336. The transmission 300 is synchronized such that transmission of the first signal 304 and the second signal 312 start at a same time $t_1$. In some embodiments, the first signal 304 and the second signal 312 also end at a same time $t_2$.

In some embodiments, the PHY preamble 320 and the PHY preamble 328 are not required to have a same duration and/or to end at a same time. In other embodiments, the PHY preamble 320 and the PHY preamble 328 are required to have a same duration and/or to end at a same time.

In an embodiment in which the second signal 312 would otherwise have a shorter duration than the first signal 304, the PHY data portion 332 is appended with a packet extension field 336 so that transmission of the signal 312 ends at $t_2$. In an embodiment, the packet extension field 336 includes arbitrary data that is ignored by receivers.

In another embodiment in which the second signal 312 has a shorter duration than the first signal 304, duration information in a MAC header (not shown) within the PHY data portion 332 is set to indicate that the transmission of the signal 312 ends at $t_2$, which causes another communication device to set a network allocation vector (NAV) timer of the other communication device to a value that indicates transmission of the signal 312 will end at $t_2$.

In another embodiment in which the second signal 312 would otherwise have a shorter duration than the first signal 304, padding information is included in the PHY data portion 332 so that transmission of the signal 312 ends at $t_2$.

In an embodiment, at least a portion of the PHY preamble 320 and at least a portion of the PHY preamble 328 include different information. In another embodiment, at least a portion of the PHY preamble 320 and at least a portion of the PHY preamble 328 have the same structure and/or include the same information. In some embodiments, at least a portion of the PHY preamble 320 and at least a portion of the PHY preamble 328 are identical.

In an embodiment in which the first channel segment 308 comprises multiple component channels (e.g., 20 MHz subchannels), at least a portion of the PHY preamble 320 (e.g., a legacy portion) is generated by generating a field corresponding to one component channel and duplicating the field over one or more other component channels corresponding to the first channel segment 308. In an embodiment in which the second channel segment 316 comprises multiple component channels (e.g., 20 MHz subchannels), at least a portion of the PHY preamble 328 (e.g., a legacy portion) is generated by generating a field corresponding to one component channel and duplicating the field over one or more other component channels corresponding to the second channel segment 316.

In various embodiments, the first channel segment 308 and the second channel segment 316 are in different RF bands or are co-located in a same RF band. In an embodiment, the RF band(s) correspond to the 2 GHz band, the 5 GHz band, and the 6 GHz bands, as described above. The first channel segment 308 and the second channel segment 316 may each be comprised of one or more of component channels. In an embodiment, a frequency bandwidth of the first channel segment 308 (i.e., a frequency bandwidth of the first signal 304) is different than a frequency bandwidth of the second channel segment 316 (i.e., a frequency bandwidth of the second signal 312). In another embodiment, the frequency bandwidth of the first channel segment 308 is the same as the frequency bandwidth of the second channel segment 316.

In an embodiment, the first channel segment 308 and the second channel segment 316 are separated in frequency. For example, a gap in frequency exists between the first channel segment 308 and the second channel segment 316. In various embodiments, the gap is at least 500 kHz, at least 1 MHz, at least 5 MHz, at least 20 MHz, etc.

In some embodiments, the first signal 304 is transmitted via a first number of spatial or space-time streams (hereinafter referred to as "spatial streams" for brevity), and the second signal 312 is transmitted via a second number of spatial streams that is different than the first number of spatial streams. In one such embodiment, the PHY preamble 320 includes a first number of LTFs corresponding to the first number of spatial streams, and the PHY preamble 328 includes a second number of LTFs (different than the first number of LTFs) corresponding to the second number of spatial streams. In another such embodiment, the PHY preamble 320 and the PHY preamble 328 comprise a same number of LTFs even when the first signal 304 is transmitted via a first number of spatial streams and the second signal 312 is transmitted via a second number of spatial streams that is different than the first number of spatial streams. In an embodiment, the same number of LTFs correspond to one of the first signal 304 and the second signal 312 with the larger number of spatial streams. In other embodiments, the first signal 304 and the second signal 312 are transmitted via a same number of spatial streams.

In an embodiment, at least the PHY data portion 324 and at least the PHY data portion 332 employ different encoding schemes and/or modulation schemes. As an example, in an embodiment, the PHY data portion 324 is generated using a first MCS and the PHY data portion 432 is generated using a second, different MCS. In other embodiments, the PHY data portion 324 and the PHY data portion 332 are generated using a same MCS.

In an embodiment, the transmission 300 corresponds to a single PPDU, where a first frequency portion of the single PPDU is transmitted via the first channel 308 and a second frequency portion of the single PPDU is transmitted via the second channel 316. In another embodiment, the first signal 304 corresponds to a first PPDU and the second signal 312 corresponds to a second PPDU. In an embodiment, each of the PHY preambles 320 and 328, and the PHY data portions 324 and 332, are comprised of one or more OFDM symbols.

In an embodiment in which the first channel segment 308 comprises multiple component channels, at least a portion of the PHY preamble 320 (e.g., a legacy portion) is generated by generating a field corresponding to one component channel and duplicating the field over one or more other component channels corresponding to the first channel segment 308. In an embodiment in which the second channel segment 316 comprises multiple component channels, at least a portion of the PHY preamble 328 (e.g., a legacy portion) is generated by generating a field corresponding to one component channel and duplicating the field over one or more other component channels corresponding to the second channel segment 316.

Figure 3B:
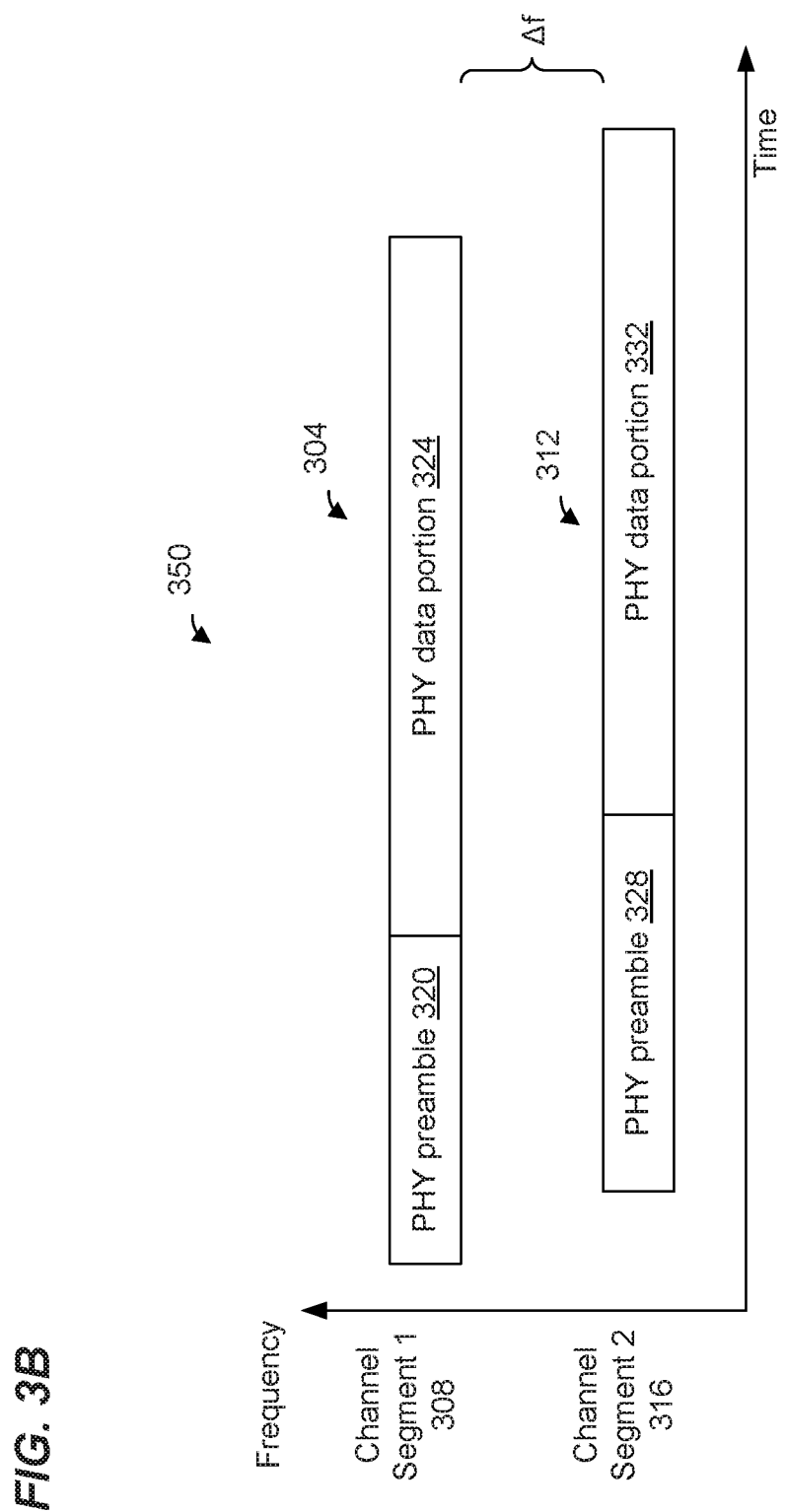
FIG. 3B is a diagram of an example transmission over different channel segments, according to another embodiment.

FIG. 3B is a diagram of an example transmission 350 by a communication device over different channel segments, according to another embodiment. In an embodiment, the transmission 350 is generated and transmitted by the network interface device 122 (FIG. 1) to one or more client stations 154 (e.g., the client station 154-1). In another embodiment, the transmission 350 is generated and transmitted by the network interface device 162 (FIG. 1) to the AP 114. In an embodiment, the communication device transmits the transmission 350 when the communication determines that only the first channel segment is available for transmission by the communication device at a first time, and the second channel segment subsequently becomes available for transmission by the communication device at a second time before completion of transmission initiated by the communication device at the first time in the first channel segment, in an embodiment. In other embodiments, the communication device transmits the transmission 350 in other suitable scenarios.

The transmission 350 is similar to the transmission 300 of FIG. 3A, and like-numbered elements are not described in detail for brevity. Unlike the transmission 300 of FIG. 3A in which transmission of the signal 304 and transmission of the signal 312 begin at the same time, transmission of the signal 304 and transmission of the signal 312 in the transmission 350 begin at different times. Additionally, transmission of the signal 304 and transmission of the signal 312 in the transmission 350 end at different times, according to some embodiments. Further, the signal 312 in the transmission 350 does not include the packet extension field 336 of FIG. 3A, according to some embodiments.

In an embodiment, a first communication device (e.g., the AP 114) transmits respective PPDUs simultaneously in respective channel segments to a second communication device (e.g., the client station 154-1) only if the second communication device supports simultaneous reception of multiple PPDUs over multiple channel segments. In an embodiment, the second communication device indicates support for simultaneous reception of multiple PPDUs over multiple channel segments to the first communication device, for example during association, re-association, etc. with the first communication device.

In an embodiment, a first communication device (e.g., the AP 114) selects multiple MPDUs to be transmitted to a second communication device (e.g., the client station 154-1), and generates one or more aggregate MPDUs (A-MPDUs) to include the one or more MPDUs for transmission to the second communication device. The first communication device transmits the one or more A-MPDUs, that include the selected one or more MPDUs, in one or more channel segments of the communication channel to the second communication device. In an embodiment, the first communication device assigns a sequence number to each of the one or more MPDUs, and includes the sequence numbers in respective headers of the one or more MPDUs. In an embodiment, the first communication device maintains respective sequence number sets corresponding to respective traffic types associated with respective TIDs, and assigns sequence numbers to MPDUs associated with a particular TID from a particular sequence number set corresponding to the particular TID. The sequence numbers assigned to the MPDUs are subsequently utilized by the second communication device to acknowledge receipt of the MPDUs associated with the corresponding TID, in an embodiment. The sequence numbers assigned to the MPDUs are also utilized by the second communication device to properly order received MPDUs associated with the corresponding TID, in an embodiment.

Figure 4:
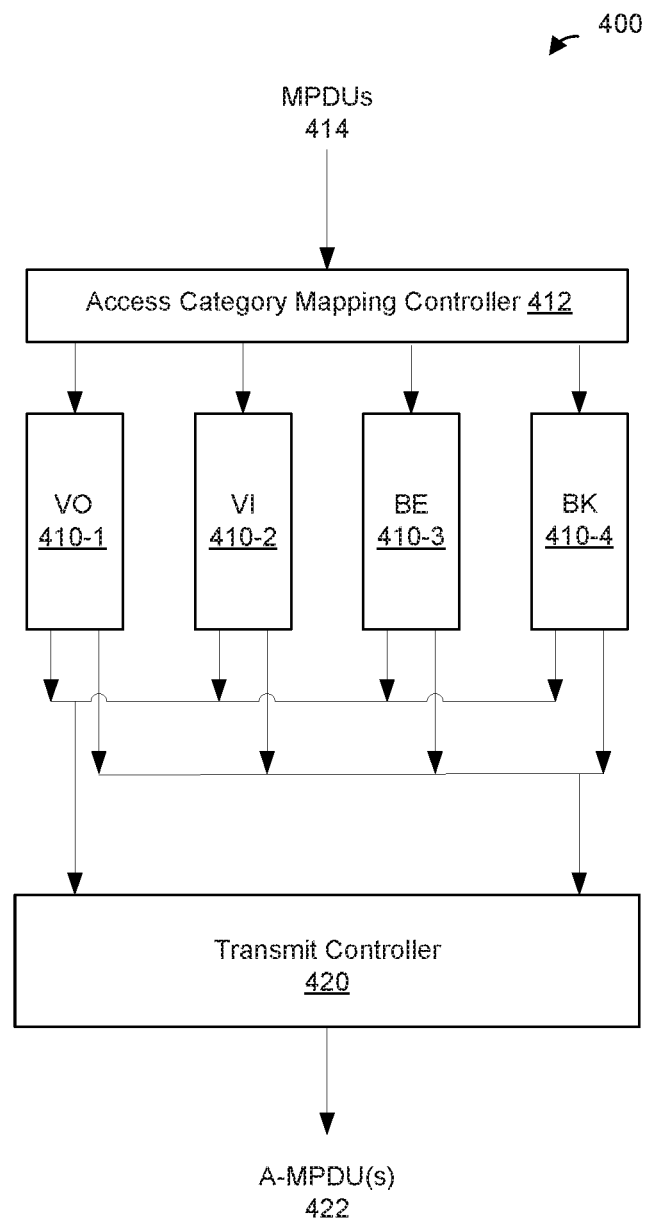
FIG. 4 is a block diagram illustrating a transmit queue system utilized by a communication device to queue data for transmission in multiple channel segments to one or more second communication devices, according to an embodiment.

The second communication device receives the one or more A-MPDUs transmitted in the one or more channel segments from the first communication device, and generates one or more block acknowledgement frames to acknowledge receipt of the one or more A-MPDUs to the first communication device. A block acknowledgement frame includes a field that indicates a starting sequence number and a bitmap, where each bit of the bitmap indicates successful or unsuccessful reception of an MPDU having a sequence number corresponding to the starting sequence number plus the number of the bit in the bitmap, in an embodiment. FIG. 4 is a block diagram illustrating a transmit queue system 400 utilized by a first communication device to queue data for transmission by the first communication device to one or more second communication devices, according to an embodiment. In an embodiment, the transmit queue system 400 is utilized by the MAC processor 126 of the AP 114 to queue data for transmission to one or more client stations 154. For example, the multi-segment channel access and transmission controller 142 of the MAC processor 126 includes, or implements, the transmit queue system 400, in an embodiment. In another embodiment, the transmit queue system 400 is utilized by the MAC processor 166 of the client station 154-1 to queue data to the AP 114. In other embodiments, the transmit queue system 400 is utilized by other suitable communication devices.

The transmit queue system 400 includes a plurality of transmit queues 410 associated with respective access categories. The plurality of transmit queues 410 includes a first transmit queue 410-1 associated with voice (VO) traffic access category, a second transmit queue 410-2 associated with video (VI) traffic access category, a third transmit queue 410-3 associated with best effort (BE) traffic access category, and a fourth transmit queue 410-4 associated with background (BK) traffic access category, in an embodiment. In other embodiments, the plurality of transmit queues 410 includes another suitable number transmit queues and/or includes transmit queues 410 associated with access categories of other suitable traffic types.

The transmit queue system 400 also includes an access category mapping controller 412 coupled to the plurality of transmit queues 410 and configured to map traffic streams to the access categories associated with the transmit queues 410. In an embodiment, the access category mapping controller 412 receives MAC layer data units (e.g., MPDUs) 414 to be transmitted by the AP 114, maps the MPDUs 414 to access categories associated with the transmit queues 410 according to traffic identifiers (TIDs) identifying type of traffic included in the MPDUs 414, and enqueues the MPDUs 414 in the corresponding transmit queues 410.

The transmit queue system 400 also includes a transmit controller 420 coupled to the plurality of transmit queues 410 and configured to select MPDUs queued in the transmit queues 410 for transmission by the first communication device. In an embodiment, in connection with transmission by the first communication device to one or more second communication devices over a communication channel that includes multiple channel segments, the transmit controller 420 is configured to select respective sets of MPDUs for transmission via respective ones of the multiple channel segments, and to generate one or more A-MPDUs 422 to include the respective sets of MPDUs for transmission via the respective ones of the multiple channel segments. In an embodiment, the transmit controller 420 is configured to select the respective sets of MPDUs such that the MPDUs are not selected from a same transmit queue 410 for simultaneous transmission over multiple channel segments. Thus, for example, if the transmit controller 420 selects MPDUs from the first transmit queue 410-1 associated with voice (VO) traffic access category for transmission via a first channel segment of a communication channel, the transmit controller 420 is configured to select MPDUs from one or more transmit queues 410 other than the transmit queue 410-1 for simultaneous transmission via a second channel segment, such that the MPDUs selected for transmission via the second channel segment exclude any MPDUs associated with (VO) traffic access category, in an embodiment. Selecting sets of MPDUs from different transmit queues 410 ensures that respective A-MPDUs simultaneously transmitted to a second communication device in respective ones of multiple channel segments do not include MPDUs associated with a same TID, and allows the second communication device to independently acknowledge the respective A-MPDUs, in an embodiment.

In another embodiment, the transmit controller 420 is configured to select MPDUs from a same transmit queue 410 for simultaneous transmission via multiple channel segments in at least some situations. In an embodiment, the transmit controller 420 selects MPDUs from a same transmit queue 410 for simultaneous transmission to a particular second communication device via multiple channel segments only if the particular second communication device supports simultaneous reception of multiple MPDUs associated with the same TID over multiple channel segments. In an embodiment, the second communication device indicates support for simultaneous reception of multiple MPDUs associated with the same TID over multiple channel segments, for example during association, re-association, etc. with the first communication device. In an embodiment, when the first communication device transmits respective MPDUs associated with a same TID simultaneously in multiple channel segments to a second communication device, the second communication device utilizes a single reorder buffers for ordering the respective MPDUs received via the multiple channel segments. In an embodiment, the second communication device is configured to utilize the single reorder buffer to order the respective MPDUs according to the sequence numbers assigned from a single sequence number set to the MPDUs associated with the particular TID included in respective A-MPDUs simultaneously transmitted (e.g., transmitted with a time overlap) in respective ones of the multiple channel segments, in an embodiment. In an embodiment, the second communication device is configured to acknowledge respective sets of MPDUs associated with a particular TID included in respective A-MPDUs transmitted in respective ones of the multiple channel segments by transmitting respective block acknowledgement data units in the corresponding ones of the channel segments. In an embodiment, the respective block acknowledgement data units transmitted in respective channel segments include respective bitmaps that indicate successful or unsuccessful receipt of the set of MPDUs included in the A-MPDUs that were transmitted in the corresponding channel segments. Thus, for example, the second communication device is configured to transmit a first block acknowledgement data unit in a first channel segment, where the first acknowledgement data unit includes a first bitmap that indicates successful or unsuccessful receipt of respective MPDUs in the set of MPDUs that were included in the first A-MPDU transmitted in the first channel segment, in an embodiment. The second communication device is configured to also transmit a second block acknowledgement data unit in the second channel segment, where the second block acknowledgement data unit includes a second bitmap that indicates successful or unsuccessful receipt of respective MPDUs in the set of MPDUs that were included in the second A-MPDU transmitted in the first channel segment in the second channel segment simultaneously (e.g., overlapping in time) with transmission of the first A-MPDU in the first channel segment, in an embodiment.

Transmission of respective acknowledgement data units in respective ones of the channel segments to acknowledge respective sets of MPDUs simultaneously in multiple channel segments allows implicit bock acknowledgment policies to be utilized in each of the multiple channel segments, in an embodiment. For example, the first A-MPDU includes an indication that a block acknowledgement is to be implicitly transmitted by the second communication device immediately after the first A-MPDU is received via the first channel segment by the second communication device. In an embodiment, the second communication device transmits a block acknowledgement data unit in the first channel segment a predetermined time period, such as a shot inter frame space (SIFS) time period or another suitable time period, after reception of the first A-MPDU in the first channel segment, to acknowledge receipt of the first set of MPDUs associated with a particular TID that were included in the first A-MPDU transmitted in the first channel segment. The first communication device also transmits a block acknowledgement data unit in the first channel segment a predetermined time interval, such as a SIFS time period or another suitable time period, after reception of the second A-MPDU in the second channel segment, to acknowledge receipt of the second set of MPDUs associated with the particular TID that was included in the second A-MPDU transmitted in the second channel segment, in an embodiment.

In another embodiment, when the first communication device is to transmit respective A-MPDUs simultaneously in respective ones of multiple channel segments, the first communication device does not utilize implicit bock acknowledgment policies in the multiple channel segments. In this embodiment, the second communication device waits for a block acknowledgement request data unit, such as a block acknowledgement request (BAR) frame or a multi-user block acknowledgement request (MU-BAR) frame, to be received from the first communication device prior to transmission of one or more block acknowledgement data units to acknowledge receipt of the sets of MPDUs included in respective A-MPDUs transmitted in respective ones of the multiple channel segments. In an embodiment, in response to receiving a block acknowledgement request data unit from the first communication device, the second communication device is configured to transmit a block acknowledgement data unit that includes a single bit map to acknowledge receipt of the respective MPDUs associated with a particular TID that were included in respective A-MPDUs transmitted in respective ones of the multiple channel segments.

In yet another embodiment, the first communication device is configured to indicate implicit block acknowledgment in an A-MPDU, among multiple A-MPDUs simultaneously transmitted in respective ones of the multiple channel segments, when transmission of the A-MPDU ends at a same or later time as any other one of the multiple A-MPDUs. In an embodiment, upon receiving the A-MPDU that ends at the same or later time as any other one of the multiple A-MPDUs, the A-MPDU including an indication that implicit transmission of a block acknowledgement is expected after reception of the A-MPDU, the second communication device transmits a block acknowledgement data unit that includes a single bitmap to acknowledge receipt of respective MPDUs that were included in the multiple A-MPDUs transmitted in the multiple channel segments.

Figure 5:
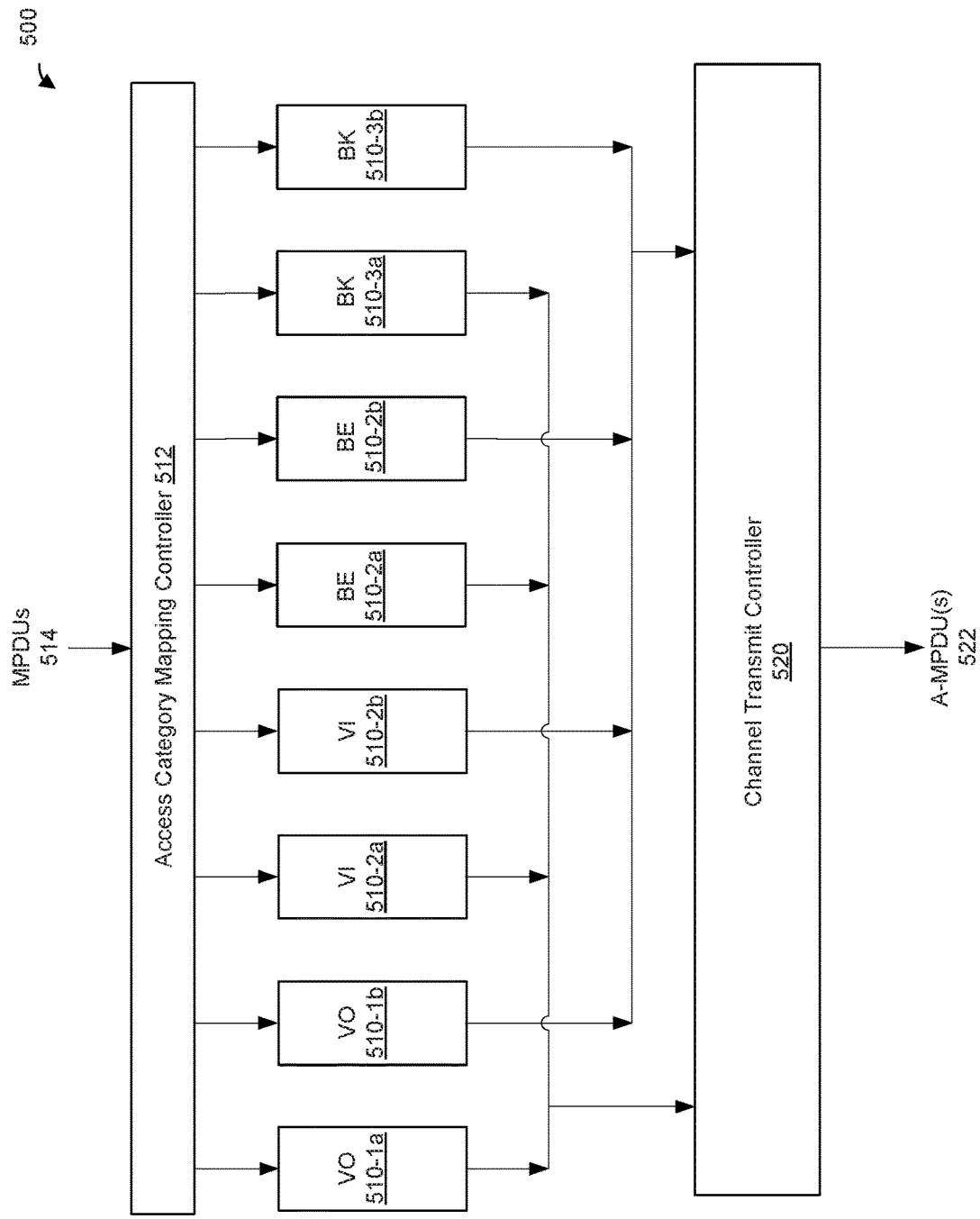
FIG. 5 is a block diagram illustrating a transmit queue system utilized by a communication device to queue data for transmission via multiple channel segments to one or more second communication devices, according to another embodiment.

FIG. 5 is a block diagram illustrating a transmit queue system 500 utilized by a first communication device to queue data for transmission by the first communication device to one or more second communication devices, according to another embodiment. In an embodiment, the transmit queue system 500 is utilized by the MAC processor 126 of the AP 114 to queue data for transmission to one or more client stations 154. For example, the multi-segment channel access and transmission controller 142 of the MAC processor 126 includes, or implements, the transmit queue system 500, in an embodiment. In another embodiment, the transmit queue system 500 is utilized by the MAC processor 166 of the client station 154-1 to queue data to the AP 114. In other embodiments, the transmit queue system 500 is utilized by other suitable communication devices.

The transmit queue system 500 includes a plurality of sets of transmit queues 510 associated with respective access categories. The plurality of sets of transmit queues 510 includes a first set of transmit queues 510-1 associated with voice (VO) traffic access category, a second set of transmit queue 510-2 associated with video (VI) traffic access category, a third set of transmit queues 510-3 associated with best effort (BE) traffic access category, and a fourth set of transmit queues 510-4 associated with background (BK) traffic access category, in an embodiment. In other embodiments, the plurality of transmit queues 510 includes another suitable number of sets transmit queues and/or includes sets of transmit queues 510 associated with access categories of other suitable traffic types.

In an embodiment, each set of transmit queues 510 includes multiple transmit queues 510, each of the multiple transmit queues 510 associated with a particular channel segment and configured to queue MAC layer data units (e.g., MPDUs) for transmission in the particular channel segment. Thus, for example, the first set of transmit queues 510-1 includes a first transmit queue 510-*la* associated with a first channel segment and configured to queue MPDUs for transmission in the first channel segment and a second transmit queue 510-1*b* associated with a second channel segment and configured to queue MPDUs for transmission in the second channel segment. Similarly, the second set of transmit queues 510-2 includes a first transmit queue 510-2*a* associated with a first channel segment and configured to queue MPDUs for transmission in the first channel segment and a second transmit queue 510-2*b* associated with a second channel segment and configured to queue MPDUs for transmission in the second channel segment, and so on, in an embodiment. Although each set of transmit queues 510 is illustrated in FIG. 5 as including two transmit queues 510 associated with respective channel segments among two channel segments, each set of transmit queues 510 includes more than two (e.g., three, four, etc.) transmit queues 510 associated with respective channel segments among a corresponding number of channel segments greater than two channel segments, in some embodiments.

The transmit queue system 500 also includes an access category mapping controller 512 coupled to the plurality of sets of transmit queues 510 and configured to map traffic streams to the access categories and channel segments associated with the transmit queues 510. In an embodiment, the access category mapping controller 512 receives MAC layer data units (e.g., MPDUs) 514 to be transmitted by the first communication device, maps a particular MPDU 514 to a particular set of transmit queues 510 according to traffic identifiers (TIDs) identifying type of traffic included in the MPDUs 514, selects a particular transmit queue 510 in the particular set of transmit queues 510, and enqueues the MPDU 514 in the particular transmit queue 510.

In an embodiment, different traffic streams, corresponding to different TIDs, for transmission to a particular second communication device are statically allocated to particular channel segments, and the access category mapping controller 512 is configured to select transmit queues 510 for queueing MPDUs associated with a particular TID and addressed to the particular second communication device based on the static allocation of the corresponding traffic stream for the particular second communication device. The static allocation of a traffic stream to a particular channel segment is determined by the first communication device, for example based on a negotiation or a renegotiation between the first communication device and the particular second communication device, in an embodiment. In another embodiment, dynamic allocation is utilized, and the mapping controller 512 is configured to dynamically select different queues 510, within a set of queues 510, at different times for queueing MPDUs associated with a particular TID and addressed to the particular second communication device.

The transmit queue system 500 also includes a transmit controller 520 coupled to the plurality of sets of transmit queues 510 and configured to select MPDUs queued in the transmit queues 510 for transmission by the first communication device. In an embodiment, in connection with transmission by the first communication device to one or more second communication devices over a communication channel that includes multiple channel segments, the transmit controller 520 is configured to select respective sets of MPDUs for transmission via respective ones of the multiple channel segments, and to generate one or more A-MPDUs 522 to include the respective sets of MPDUs for transmission via the respective ones of the multiple channel segments. In an embodiment, the transmit controller 520 is configured to select a set of MPDUs for transmission in particular channel segment from transmit queues 510 that are associated with the particular channel segment. For example, the transmit controller 520 is configured to select a first set of MPDUs for transmission in the first channel segment from one or more of the transmit queues 510-1*a*, 510-2*a*, 510-3*a* and 510-4*a* associated with the first channel segment, and to select a second set of MPDUs for transmission in the second channel segment from one or more of the transmit queues 510-1*b*, 510-2*b*, 510-3*b* and 510-4*b* associated with the first channel segment.

In an embodiment, respective ones of the transmit queues 510 in a particular set of transmit queues 510 are configured to queue MPDUs associated with a particular TID and addressed to different second communication devices. In this embodiments, if a first transmit queue 510 in a particular set of transmit queues 510 queues MPDUs associated with a particular TID and addressed to a particular second communication device, then a second transmit queue 510 in the particular set of transmit queues 510 does not simultaneously queue MPDUs associated with the particular TID and addressed to the particular second communication device. Referring, for example, to the first set of transmit queues 510-1, if MPDUs associated with a particular TID are queued in the first transmit queue 510-*la* for transmission in the first channel segment to a particular second communication device, then the second transmit queue 510-1*b* does not queue MPDUs associated with the particular TID for transmission in the second channel segment to the particular second communication device, in an embodiment. Thus, when the transmit controller 520 selects the second set of MPDUs for transmission in the second channel segment, the second set of MPDUs will necessarily exclude any MPDUs associated with the particular TID and addressed to the particular second communication device, in an embodiment. The particular channel segment to be used for transmission of MPDUs associated with the particular TID to the particular second communication device is negotiated between the first communication device and the particular second communication device, and is subject to renegotiation between the first communication device and the particular second communication device, in an embodiment. Queueing MPDUs associated with a particular TID and addressed to a particular second communication device in a particular transmit queue 510 associated with a particular channel segment ensures that respective MPDUs associated with the particular TID will not be simultaneously transmitted to the particular second communication device in multiple channel segment, in an embodiment.

In another embodiment, respective ones of the transmit queues 510 in a particular set of transmit queues 510 simultaneously queue MPDUs associated with a particular TID and addressed to a particular second communication device in some situations. In this embodiments, a first transmit queue 510 in a particular set of transmit queues 510 and a second transmit queue 510 in a particular set of transmit queues 510 simultaneously queue MPDUs associated with a particular TID and addressed to a particular second communication device in some situations. In an embodiment, a first transmit queue 510 in a particular set of transmit queues 510 and a second transmit queue 510 in a particular set of transmit queues 510 simultaneously queue MPDUs associated with a particular TID and addressed to a particular second communication device only if the particular second communication device supports simultaneous reception of multiple MPDUs associated with the same TID over multiple channel segments. In an embodiment, the second communication device indicates support for simultaneous reception of multiple MPDUs associated with the same TID over multiple channel segments, for example during association, re-association, etc. with the first communication device. In this case, respective MPDUs associated with the particular TID are simultaneously transmitted to the particular second communication device in different channel segments in some situations, in an embodiment.

In an embodiment, the first communication device assigns, from a same sequence number set associated with a particular TID, sequence numbers to respective MPDUs associated with the particular TID that are queued in different transmit queues 510 in the particular set of transmit queues 510. Accordingly, in this embodiment, a same sequence number cannot be assigned to respective different MPDUs associated with the TID and addressed to the particular second communication device that are transmitted to the particular second communication device in different channel segments. The particular second communication device utilizes the sequence numbers indicated in the MPDUs associated with the TID and received in different channel segments to acknowledge receipt of the MPDUs using a same bitmap, in an embodiment. The particular second communication device also utilizes the sequence numbers indicated in the MPDUs associated with the TID and received in different channel segments to properly order, using a same reorder buffer associated with the TID, the MPDUs associated with the TID and received in different channel segments.

In another embodiment, the first communication device assigns a block acknowledgement sequence number and a baseline sequence number to each MPDU associated with a particular TID that are queued in different transmit queues 510 in the particular set of transmit queues 510 associated with the particular TID. The block acknowledgment sequence numbers are assigned to respective MPDUs associated with the particular TID and queued in different transmit queues 510 from respective different block acknowledgement sequence number sets, allowing the particular second communication device to individually acknowledge respective sets of MPDUs received associated with the TID and received in different channel segments using respective bitmaps, in an embodiment. For example, when a second communication device receives a first set of MPDUs, associated with the TID, that was transmitted in a first channel segment and receives a second set of MPDUs, associated with the TID, that was simultaneously transmitted in a second channel segment, the second communication device i) transmits, in the first channel segment, a first block acknowledgement data unit that includes a first bitmap to acknowledge the first set of MPDUs based on the BA sequence numbers that were included in respective MPDUs in the first set of MPDUs and ii) transmits, in the second channel segment, a second block acknowledgement data unit that includes a second bitmap to acknowledge the second set of MPDUs based on the BA sequence numbers that were included in respective MPDUs in the second set of MPDUs. The baseline sequence number, on the other hand, is assigned from a same sequence number set that is shared among the multiple channel segments. The second communication device utilizes the baseline sequence numbers that were included in MPDUs in the first set of MPDUs and the second set of MPDUs to jointly order (e.g., using a same reorder buffer associated with the TID) the MPDUs in the first set of MPDUs and the second set of MPDUs, in an embodiment.

More generally, in an embodiment, a first communication device maintains a same sequence number set associated with a particular TID and a particular second communication device if the particular second communication device supports simultaneous reception of multiple MPDUs associated with the same TID over multiple channel segments. In this case, the first communication device utilizes the same sequence number set to assign sequence numbers to MPDUs associated with the particular TID and addressed to the particular second communication device, even when the MPDUs are to be transmitted via different channel segments that, in some embodiments, are associated with respective different MAC addresses. In another embodiment, the first communication device assigns a block acknowledgement sequence number and a baseline sequence number to each MPDU associated with a particular TID to be transmitted to the particular second communication device over multiple frequency segments, that, in some embodiments, are associated with respective different MAC addresses. The block acknowledgment sequence numbers are assigned to respective MPDUs associated with the particular TID and queued in different transmit queues 510 from respective different block acknowledgement sequence number sets, allowing the particular second communication device to individually acknowledge respective sets of MPDUs received associated with the TID and received in different channel segments using respective bitmaps, in an embodiment. The baseline sequence number, on the other hand, is assigned from a same sequence number set that is shared among the multiple channel segments. The second communication device utilizes the baseline sequence numbers that were included in MPDUs in the first set of MPDUs and the second set of MPDUs to jointly order (e.g., using a same reorder buffer associated with the TID) the MPDUs transmitted in multiple channel segments, in an embodiment.

Figure 6:
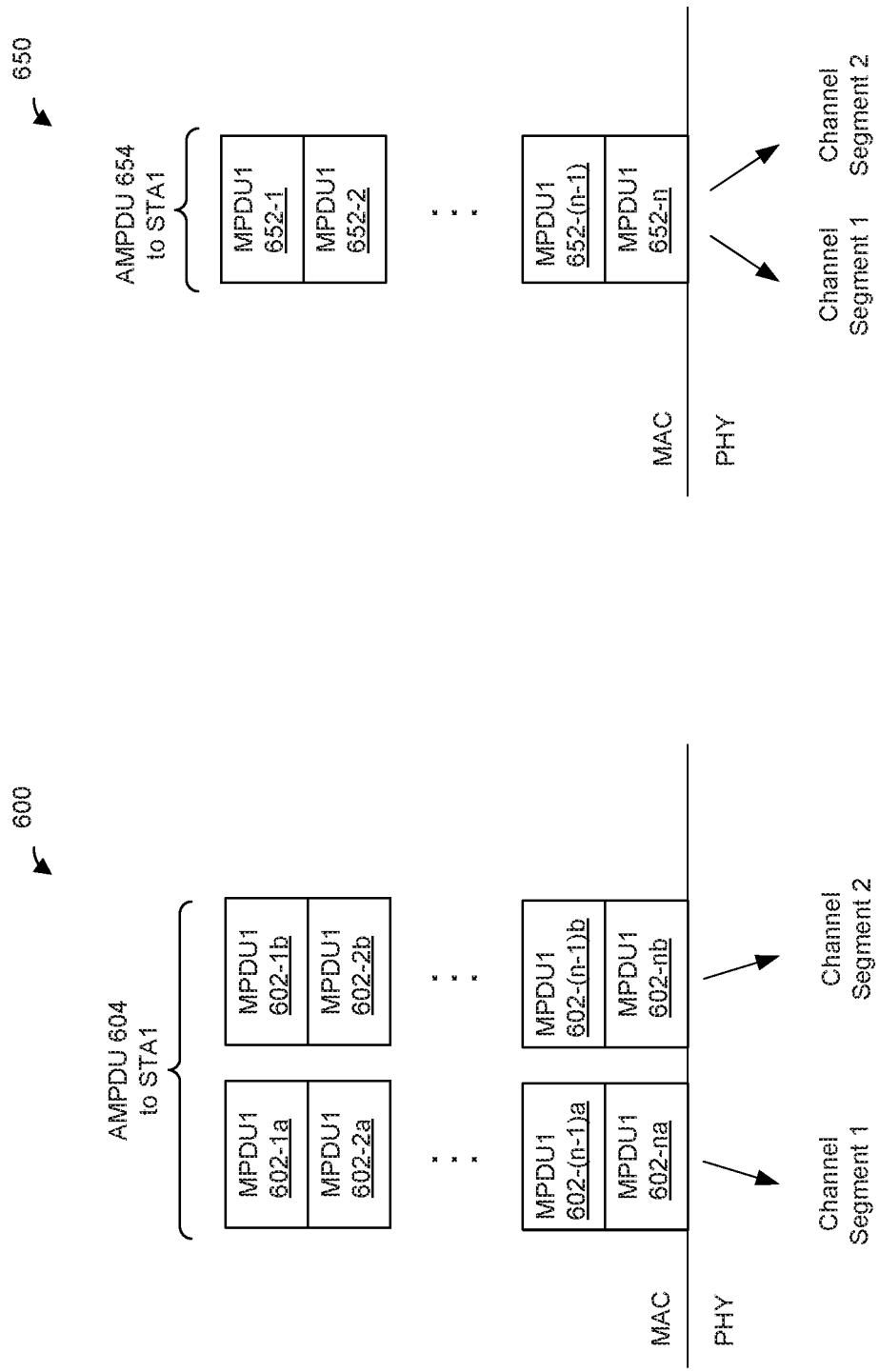
FIGS. 6A-B are diagrams diagram illustrating transmission schemes used for transmission of a single aggregated data unit from a first communication device to a second communication device over a communication channel that includes multiple channel segments, according to various embodiments.

On the other hand, if a particular second communication device does not support simultaneous reception of multiple MPDUs associated with a TID over multiple channel segments, the first communication device, in some embodiments, utilizes different sequence number sets for transmission of MPDUs associated with the TID to the particular second communication device via different channel segments (at different non-overlapping times) that, in some embodiments, are associated with respective different MAC addresses. FIGS. 6A-B is a diagram illustrating transmission schemes 600, 650 used for transmission of a single A-MPDU from a first communication device to a second communication device over a communication channel that includes multiple channel segments, according to various embodiments. In an embodiment, the AP 114 is configured in implement the transmission schemes 600, 650 to transmit an A-MPDU to a client station 154 over a communication channel that includes multiple channel segments. In another embodiment, a client station 154 is configured in implement the transmission schemes 600, 650 to transmit an A-MPDU to the AP 114 over a communication channel that includes multiple channel segments. In other embodiments, the transmission schemes 600, 650 are utilized by other suitable communication devices.

Referring first to FIG. 6A, in the transmission scheme 600, the first communication device distributes MPDUs 602 included in an A-MPDU 604 to the multiple channel segments such that each MPDU 602 is transmitted, in its entirety, in one of the multiple channel segments. For example, in an embodiment, the MPDUs 602 are separated at the MAC level (e.g., by the MAC processor 126, 166) into respective sets of MPDUs 602, and the respective sets of MPDUs are provided to a PHY processor (e.g., PHY processor 130, 170) for transmission in respective channel segments. In an embodiment, the first communication device at least substantially equally distributes the MPDUs 602 to the multiple channel segments, for example by distributing at least substantially same numbers of MPDUs to respective ones of the multiple channel segments. Distributing the MPDUs 602 to multiple channel segments such at the MPDUs are at least substantially equally distributed among the multiple channel segments results in fewer padding bits that need to be added to the sets of MPDUs 602 to equalize lengths of data portions that include the respective sets of the MPDUs 602 in the multiple channel segments, in at least some embodiments.

Figure 7:
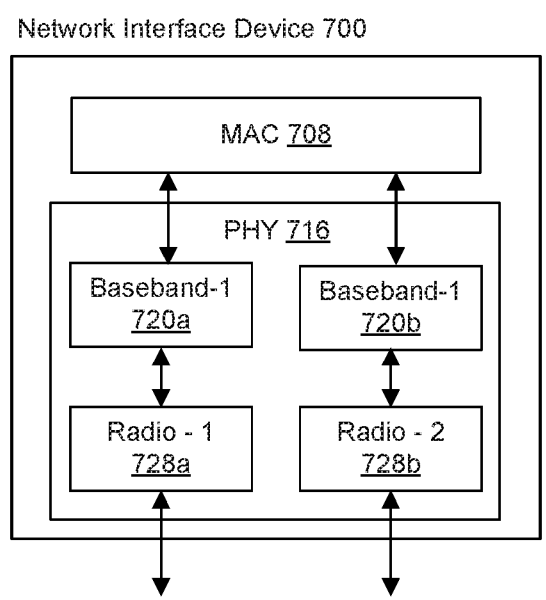
FIG. 7 is a diagram of an example network interface device configured for multi-channel segment operation, according to an embodiment.

Referring now to FIG. 6B, in the transmission scheme 650, the first communication device distributes bits of MPDUs 652 included in an A-MPDU 654 to the multiple channel segments such respective portions of a particular MPDU 652 can be transmitted in respective ones of the multiple channel segments. In an embodiment, distribution of bits of MPDUs 652 included in an A-MPDU 654 to the multiple channel segments is performed at the PHY level (e.g., by the PHY processor 130, 170) for transmission in respective channel segments. FIG. 7 is a diagram of an example network interface device 700 configured for multi-channel segment operation, according to an embodiment. In an embodiment, the network interface device 700 corresponds to the network interface device 122 of the AP 114 of FIG. 1. In another embodiment, the network interface device 700 corresponds to the network interface device 162 of the client station 154-1 of FIG. 1.

The network interface device 700 is configured for operation over two channel segments, in the illustrated embodiment. The network interface device 700 includes a MAC processor 708 coupled to a PHY processor 716. The MAC processor 708 exchanges frames (or PSDUs) with the PHY processor 716.

In an embodiment, the MAC processor 708 corresponds to the MAC processor 126 of FIG. 1. In another embodiment, the MAC processor 708 corresponds to the MAC processor 166 of FIG. 1. In an embodiment, the PHY processor 716 corresponds to the PHY processor 130 of FIG. 1. In another embodiment, the PHY processor 716 corresponds to the PHY processor 170 of FIG. 1.

The PHY processor 716 includes a first baseband signal processor 720a corresponding to a first channel segment and a second baseband signal processor 702b corresponding to a second channel segment. The first baseband signal processor 720a is coupled to a first RF radio (Radio-1) 728a and the second baseband signal processor 702b is coupled to a second RF radio (Radio-2) 728b. In an embodiment, the RF radio 728a and the RF radio 728b correspond to the transceivers 134 of FIG. 1. In another embodiment, the RF radio 728a and the RF radio 728b correspond to the transceivers 174 of FIG. 1. In an embodiment, the RF radio 728a is configured to operate on a first RF band, and the RF radio 728b is configured to operate on a second RF band. In another embodiment, the RF radio 728a and the RF radio 728b are both configured to operate on the same RF band.

In an embodiment, the MAC processor 708 generates data corresponding to MAC layer data units (e.g., frames) and provides the frames (or PSDUs) to the baseband signal processor 720. The baseband signal processor 720 is configured to receive frames (or PSDUs) from the MAC processor 708, and encapsulate the frames (or PSDUs) into respective packets and generate respective baseband signals corresponding to the respective packets.

Although the network interface 700 is illustrated in FIG. 7 including a single MAC processor 708, the network interface device 700 includes multiple MAC processors 708, with respective ones of the multiple MAC processors 708 corresponding to respective ones of the channel segments, in some embodiments. The multiple MAC processors 708 are synchronized, in some embodiments. For example, the multiple MAC processors 708 are synchronized so that respective ones of the multiple MAC processors 708 provide respective MAC layer data units to the PHY processor 716 at a same time or during a same time interval, in an embodiment. In another embodiment, the network interface 700 includes a single upper layer MAC processor coupled to multiple lower level MAC processors, respective ones of the multiple lower level MAC processors corresponding to respective ones of the channel segments. In some embodiments, each lower level MAC processor is associated with a respective network address (e.g., a MAC address), i.e., a first lower level MAC processor is associated with a first network address (e.g., a first MAC address) and a second lower level MAC processor is associated with a second network address (e.g., a second MAC address) that is different than the first network address.

The baseband signal processor 720a provides the respective baseband signal generated by the baseband signal processor 720a to the Radio-1 728a. The baseband signal processor 720b provides the respective baseband signal generated by the baseband signal processor 720b to the Radio-1 728b. The Radio-1 728a and Radio-2 728b upconvert the respective baseband signals to generate respective RF signals for transmission via the first channel segment and the second channel segment, respectively. The Radio-1 728a transmits a first RF signal via the first channel segment and the Radio-2 728b transmits a second RF signal via the second channel segment.

The Radio-1 728a and the Radio-2 728b are also configured to receive respective RF signals via the first channel segment and the second channel segment, respectively. The Radio-1 728a and the Radio-2 728b generate respective baseband signals corresponding to the respective received signals. The generated respective baseband signals are provided to the respective baseband signal processors 720a and 720b. The respective baseband signal processors 720a and 720b generate respective PSDUs corresponding to the respective received signals, and provide the respective PSDUs to the MAC processor 708. The MAC processor 708 processes the PSDUs received from the baseband signal processors 720a and 720b, in an embodiment.

Figure 8:
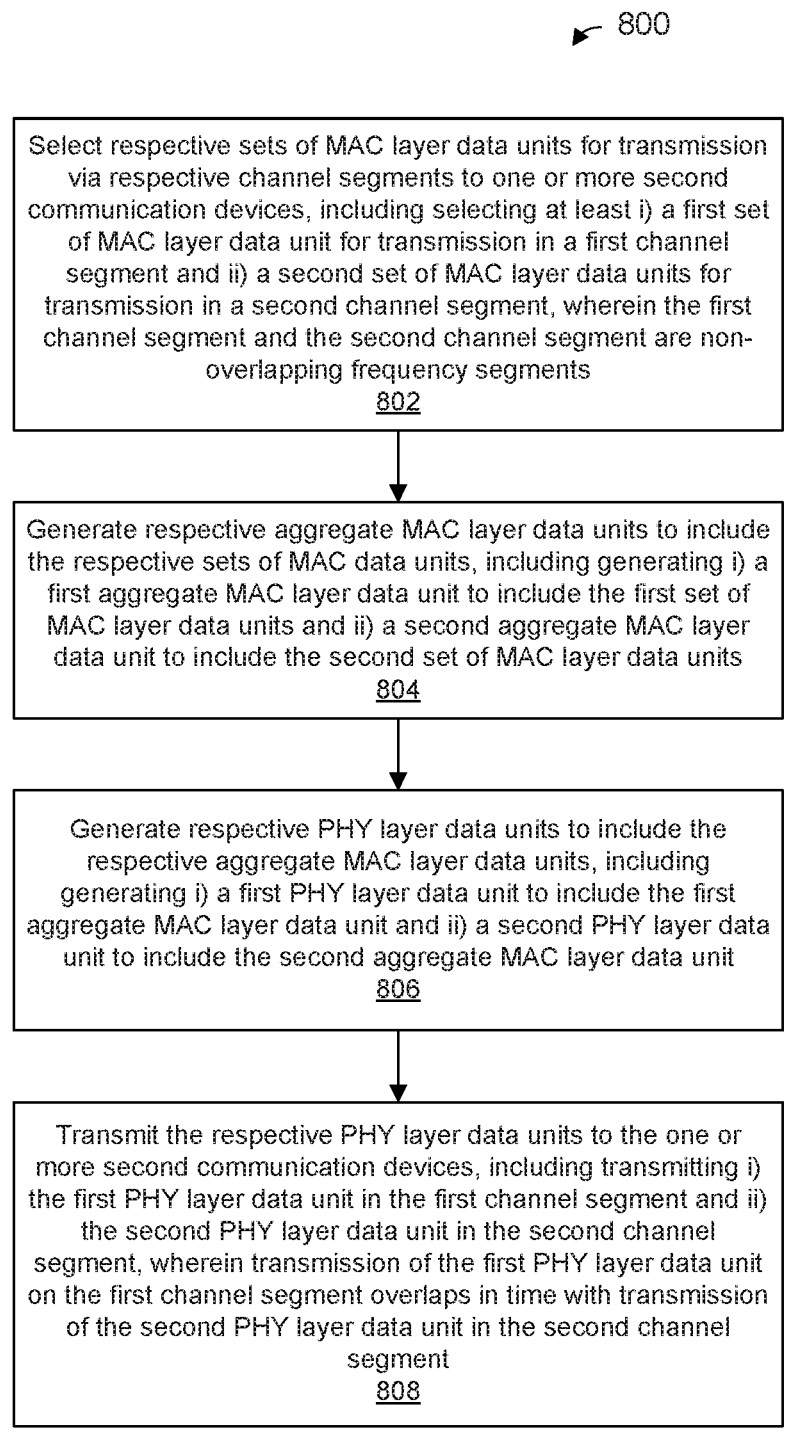
FIG. 8 is a flow diagram of an example method for communicating in a WLAN via a communication channel that includes multiple channel segments, according to an embodiment.

FIG. 8 is a flow diagram of an example method 800 implemented by a first communication device in a WLAN for communication via a communication channel that includes a plurality of channel segments, according to an embodiment. In some embodiments, the AP 114 and/or the client station 154 is configured to implement the method 800, and FIG. 8 is described with reference to FIG. 1 merely for explanatory purposes. In other embodiments, the method 800 is implemented by another suitable communication device.

At block 802, the first communication device selects (e.g., the network interface 122 selects, the MAC processor 126 selects, the multi-segment channel access and transmission controller 142 selects, the network interface 162 selects, the MAC processor 166 selects, etc.) respective sets of MAC layer data units for transmission via respective channel segments to one or more second communication devices. In an embodiment, selecting the respective sets of MAC data unit at block 802 includes selecting at least i) a first set of MAC layer data unit for transmission in a first channel segment and ii) a second set of MAC layer data units for transmission in a second channel segment. In an embodiment, the first channel segment corresponds to the channel segment 208 of the communication channel 200 of FIG. 2, and the second channel segment corresponds to the channel segment 216 of the communication channel 200 of FIG. 2. In other embodiments, the first channel segment is different from the channel segment 208 of FIG. 2 and/or the second channel segment is different from the channel segment 216 of FIG. 2. In an embodiment, the first channel segment and the second channel segment are non-overlapping frequency segments.

In an embodiment, the first communication device selects the respective sets of MAC layer units at block 802 from a plurality of transmit queues, such as the plurality of transmit queues 410 of FIG. 4, respectively associated with respective access categories and/or traffic types. In an embodiment, the first communication device selects the respective sets of MAC layer data units in the manner described above with reference to FIG. 4. The first communication device assigns sequence numbers to MAC layer data units in the respective sets of MAC data units in the manner described above with reference to FIG. 4, in an embodiment.

In another embodiment, the first communication device selects the respective sets of MAC layer units at block 802 from a plurality of sets of transmit queues, such as the plurality of sets of transmit queues 510 of FIG. 5, respectively associated with respective access categories and/or traffic types. In an embodiment, the first communication device selects the respective sets of MAC layer data units in the manner described above with reference to FIG. 5. The first communication device assigns sequence numbers to MAC layer data units in the respective sets of MAC data units in the manner described above with reference to FIG. 5, in an embodiment.

In an embodiment, selecting respective sets of MAC layer data units at block 802 includes selecting the first set of MAC layer data units to include at least one MAC layer data unit i) addressed to a particular second communication device and ii) associated with a particular traffic identifier indicating a particular traffic type, and selecting the second set of MAC layer data to exclude any MAC layer data units i) addressed to the particular second communication device and ii) associated with the particular traffic identifier indicating the particular traffic. In another embodiment, selecting respective sets of MAC layer data units at block 802 includes selecting the first set of MAC layer data units to include at least a first MAC layer data unit i) addressed to a particular second communication device and ii) associated with a particular traffic identifier indicating a particular traffic type, and selecting the second set of MAC layer data to include at least a second MAC layer data unit i) addressed to the particular second communication device and ii) associated with the particular traffic identifier indicating the particular traffic type.

At block 804, the first communication device generates (e.g., the network interface 122 selects, the MAC processor 126 generates, the multi-segment channel access and transmission controller 142 generates, the network interface 162 generates, the MAC processor 166 generates, etc.) respective aggregate MAC layer data units to include the respective sets of MAC layer data units. In an embodiment, generating the respective aggregate MAC data units at block 804 includes generating i) a first aggregate MAC layer data unit to include the first set of MAC layer data units and ii) a second aggregate MAC layer data unit to include the second set of MAC layer data units.

At block 806, the first communication device generates (e.g., the network interface 122 generates, the PHY processor 130 generates, the network interface 162 generates, the PHY processor 270 generates, etc.) respective PHY layer data units to include the respective aggregate MAC layer data units. In an embodiment, the first communication device generates the PPDUs 304, 312 of FIGS. 3A-B. In other embodiments, the first communication device generates respective PHY layer data units different from the PPDUs 304, 312 of FIGS. 3A-B. In an embodiment, generating the respective PHY layer data units at block 806 includes generating i) a first PHY layer data unit to include the first aggregate MAC layer data unit and ii) a second PHY layer data unit to include the second aggregate MAC layer data unit.

At block 808, the first communication device transmits (e.g., the network interface 122 transmits, the PHY processor 130 transmits, the network interface 162 transmits, the PHY processor 270 transmits, etc.) the respective PHY layer data units generated at block 806 to the one or more second communication devices. Transmitting the respective PHY layer data units at block 808 includes i) the first PHY layer data unit in the first channel segment and ii) the second PHY layer data unit in the second channel segment, in an embodiment. Transmission of the first PHY layer data unit on the first channel segment overlaps in time with transmission of the second PHY layer data unit in the second channel segment, in an embodiment. MAC layer data unit selection and sequence number assignment performed at block 802 allow the one or more second communication devices to properly order the respective sets of MAC layer data units that are transmitted in respective channel segments, and to efficiently acknowledge receipt respective MAC layer data units in the respective sets of MAC layer data units simultaneously transmitted in the plurality of channel segments, in various embodiments.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN) via a communication channel that includes a plurality of channel segments, the method comprising:

selecting, at a first communication device, respective sets of medium access control (MAC) layer data units for transmission via respective channel segments, among the plurality of channel segments, to one or more second communication devices, including selecting at least i) a first set of MAC layer data units for transmission in a first channel segment and ii) a second set of MAC layer data units for transmission in a second channel segment, wherein the first channel segment and the second channel segment are non-overlapping frequency segments;

generating, at the first communication device, respective aggregate MAC layer data units to include the respective sets of MAC layer data units, including generating i) a first aggregate MAC layer data unit to include the first set of MAC layer data units and ii) a second aggregate MAC layer data unit to include the second set of MAC layer data units;

generating, at the first communication device, respective physical (PHY) layer data units to include the respective aggregate MAC layer data units, including generating i) a first PHY layer data unit to include the first aggregate MAC layer data unit and ii) a second PHY layer data unit to include the second aggregate MAC layer data unit; and transmitting, from the first communication device, the respective PHY layer data units to the one or more second communication devices, including transmitting i) the first PHY layer data unit in the first channel segment and ii) the second PHY layer data unit in the second channel segment, wherein transmission of the first PHY layer data unit in the first channel segment overlaps in time with transmission of the second PHY layer data unit in the second channel segment.

2. The method of claim 1, wherein selecting respective sets of MAC layer data units for transmission via respective channel segments includes
selecting the first set of MAC layer data units to include at least one MAC layer data unit i) addressed to a particular second communication device and ii) associated with a particular traffic identifier indicating a particular traffic type, and
selecting the second set of MAC layer data to exclude any MAC layer data units i) addressed to the particular second communication device and ii) associated with the particular traffic identifier indicating the particular traffic type.

3. The method of claim 1, wherein selecting respective sets of MAC layer data units for transmission via respective channel segments includes
selecting the first set of MAC layer data units to include at least a first MAC layer data unit i) addressed to a particular second communication device and ii) associated with a particular traffic identifier indicating a particular traffic type, and
selecting the second set of MAC layer data to include at least a second MAC layer data unit i) addressed to the particular second communication device and ii) associated with the particular traffic identifier indicating the particular traffic type.

4. The method of claim 3, further comprising,
in response to transmitting the first PHY layer data unit that includes the first aggregate MAC layer data unit in the first channel segment to the particular second communication device, receiving a first block acknowledgement data unit from the particular second communication device, the first block acknowledgment data unit including a first bitmap associated with the traffic identifier, the first bitmap acknowledging receipt of the at least the first MAC layer data unit by the particular second communication device, and
in response to transmitting the second PHY layer data unit that includes the second aggregate MAC layer data unit in the second channel segment to the particular second communication device, receiving a second block acknowledgement data unit from the particular second communication device, the second block acknowledgment data unit including a second bitmap associated with the traffic identifier, the second bitmap acknowledging receipt of the at least the second MAC layer data unit by the particular second communication device.

5. The method of claim 3, further comprising, after transmitting i) the first PHY layer data unit that includes the first aggregate MAC layer data unit in the first channel segment to the particular second communication device and ii) the second PHY layer data unit that includes the second aggregate MAC layer data unit in the second channel segment to the particular second communication device, transmitting a block acknowledgment request data unit in one of the first channel segment and the second channel segment to the particular second communication device.

6. The method of claim 5, further comprising, in response to transmitting the block acknowledgement request data unit to the particular second communication device, receiving, at the first communication device via the one of the first channel segment and the second channel segment, a block acknowledgment data unit from the particular second communication device, the block acknowledgment data unit acknowledging receipt of both i) the at least the first MAC layer data unit associated with the traffic identifier and received by the particular second communication device via the first channel segment and ii) the at least the second MAC layer data unit associated with the traffic identifier and received by the particular second communication device via the second channel segment.

7. The method of claim 6, wherein receiving the block acknowledgment data unit comprises receiving a block acknowledgement data unit that includes a single bitmap associated with the traffic identifier, the single bitmap acknowledging receipt of both i) the at least the first MAC layer data unit associated with the traffic identifier and received by the particular second communication device via the first channel segment and ii) the at least the second MAC layer data unit associated with the traffic identifier and received by the particular second communication device via the second channel segment.

8. The method of claim 1, wherein
the method further comprises,
prior to transmitting the first PHY layer data unit in the first channel segment, performing a first set of backoff procedures respectively associated with respective traffic types among a plurality of traffic types,
based on the first set of backoff procedures, obtaining access to the first channel segment for transmission of traffic of a first traffic type among the plurality of traffic types, and
selecting the first set of MAC layer data units comprises selecting the first set of MAC layer data units to include one or more MAC layer data units that include data of the first traffic type.

9. The method of claim 8, further comprising, prior to transmitting the second PHY layer data unit in the second channel segment, performing a second set of backoff procedures in the second channel segment, respective backoff procedures in the second set of backoff procedures associated with respective traffic types among the plurality of traffic types, including, after obtaining access to the first channel segment for transmission of traffic of the first traffic type among the plurality of traffic types, suspending a backoff procedure, in the second set of backoff procedures, associated with first traffic type.

10. The method of claim 9, further comprising, after transmission of the PHY layer data unit is completed in the first channel segment, resuming the backoff procedure associated with the first traffic type in the second channel segment.

11. A first communication device, comprising:
a wireless network interface device that is configured to communicate in a wireless local area network (WLAN) via a communication channel that includes a plurality of channel segments, the wireless network interface device having one or more integrated circuit (IC) devices configured to:
select respective sets of medium access control (MAC) layer data units for transmission via respective channel segments, among the plurality of channel segments, to one or more second communication devices, the one or more IC devices being configured to select at least i) a first set of MAC layer data units for transmission in a first channel segment and ii) a second set of MAC layer data units for transmission in a second channel segment, wherein the first channel segment and the second channel segment are non-overlapping frequency segments,
generate respective aggregate MAC layer data units to include the respective sets of MAC layer data units, the one or more IC devices being configured to generate i) a first aggregate MAC layer data unit to include the first set of MAC layer data units and ii) a second aggregate MAC layer data unit to include the second set of MAC layer data units,
generate respective physical (PHY) layer data units to include the respective aggregate MAC layer data units, the one or more IC devices being configured to generate i) a first PHY layer data unit to include the first aggregate MAC layer data unit and ii) a second PHY layer data unit to include the second aggregate MAC layer data unit, and
transmit the respective PHY layer data units to the one or more second communication devices, the one or more IC devices being configured to transmit i) the first PHY layer data unit in the first channel segment and ii) the second PHY layer data unit in the second channel segment, wherein transmission of the first PHY layer data unit in the first channel segment overlaps in time with transmission of the second PHY layer data unit in the second channel segment.

12. The first communication device of claim 11, wherein the one or more IC devices are configured to:
select the first set of MAC layer data units to include at least one MAC layer data unit i) addressed to a particular second communication device and ii) associated with a particular traffic identifier indicating a particular traffic type, and
select the second set of MAC layer data to exclude any MAC layer data units i) addressed to the particular second communication device and ii) associated with the particular traffic identifier indicating the particular traffic type.

13. The first communication device of claim 11, wherein the one or more IC devices are configured to:
select the first set of MAC layer data units to include at least a first MAC layer data unit i) addressed to a particular second communication device and ii) associated with a particular traffic identifier indicating a particular traffic type, and
select the second set of MAC layer data to include at least a second MAC layer data unit i) addressed to the particular second communication device and ii) associated with the particular traffic identifier indicating the particular traffic type.

14. The first communication device of claim 11, wherein the one or more IC devices are further configured to
in response to transmitting the first PHY layer data unit that includes the first aggregate MAC layer data unit in the first channel segment to the particular second communication device, receive a first block acknowledgement data unit from the particular second communication device, the first block acknowledgment data unit including a first bitmap associated with the traffic identifier, the first bitmap acknowledging receipt of the at least the first MAC layer data unit by the particular second communication device, and
in response to transmitting the second PHY layer data unit that includes the second aggregate MAC layer data unit in the second channel segment to the particular second communication device, receive a second block acknowledgement data unit from the particular second communication device, the second block acknowledgment data unit including a second bitmap associated with the traffic identifier, the second bitmap acknowledging receipt of the at least the second MAC layer data unit by the particular second communication device.

15. The first communication device of claim 13, wherein the one or more IC devices are further configured to, after transmitting i) the first PHY layer data unit that includes the first aggregate MAC layer data unit in the first channel segment to the particular second communication device and ii) the second PHY layer data unit that includes the second aggregate MAC layer data unit in the second channel segment to the particular second communication device, transmit a block acknowledgment request data unit in one of the first channel segment and the second channel segment to the particular second communication device.

16. The first communication device of claim 15, wherein the one or more IC devices are further configured to, in response to transmitting the block acknowledgement request data unit to the particular second communication device, receive, via the one of the first channel segment and the second channel segment, a block acknowledgment data unit from the particular second communication device, the block acknowledgment data unit acknowledging receipt of both i) the at least the first MAC layer data unit associated with the traffic identifier and received by the particular second communication device via the first channel segment and ii) the at least the second MAC layer data unit associated with the traffic identifier and received by the particular second communication device via the second channel segment.

17. The first communication device of claim 15, wherein the one or more IC devices are further configured to receive the block acknowledgement data unit at least by receiving a block acknowledgment data unit that includes a single bitmap associated with the traffic identifier, the single bitmap acknowledging receipt of both i) the at least the first MAC layer data unit associated with the traffic identifier and received by the particular second communication device via the first channel segment and ii) the at least the second MAC layer data unit associated with the traffic identifier and received by the particular second communication device via the second channel segment.

18. The first communication device of claim 11, wherein the one or more IC devices are further configured to:
- prior to transmitting the first PHY layer data unit in the first channel segment, perform a first set of backoff procedures respectively associated with respective traffic types among a plurality of traffic types,
- based on the first set of backoff procedures, obtain access to the first channel segment for transmission of traffic of a first traffic type among the plurality of traffic types, and
- select the first set of MAC layer data units to include one or more MAC layer data units that include data of the first traffic type.

19. The first communication device of claim 18, wherein the one or more IC devices are further configured to:
- prior to transmitting the second PHY layer data unit in the second channel segment, perform a second set of backoff procedures in the second channel segment, respective backoff procedures in the second set of backoff procedures associated with respective traffic types among the plurality of traffic types,
- the one or more IC devices being configured to, after obtaining access to the first channel segment for transmission of traffic of the first traffic type among the plurality of traffic types, suspend a backoff procedure, in the second set of backoff procedures, associated with first traffic type.

20. The first communication device of claim 19, wherein the one or more IC devices are further configured to, after transmission of the PHY layer data unit is completed in the first channel segment, resume the backoff procedure associated with the first traffic type in the second channel segment.

* * * * *